US010625344B2

(12) United States Patent
Suganuma et al.

(10) Patent No.: US 10,625,344 B2
(45) Date of Patent: Apr. 21, 2020

(54) METHOD FOR PRODUCING COPPER PARTICLES, COPPER PARTICLES, AND COPPER PASTE

(71) Applicant: OSAKA UNIVERSITY, Osaka (JP)

(72) Inventors: Katsuaki Suganuma, Suita (JP); Jinting Jiu, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 238 days.

(21) Appl. No.: 15/555,094

(22) PCT Filed: Mar. 4, 2016

(86) PCT No.: PCT/JP2016/056851
§ 371 (c)(1),
(2) Date: Sep. 1, 2017

(87) PCT Pub. No.: WO2016/140351
PCT Pub. Date: Sep. 9, 2016

(65) Prior Publication Data
US 2018/0104747 A1   Apr. 19, 2018

(30) Foreign Application Priority Data

Mar. 5, 2015 (JP) ................. 2015-043640

(51) Int. Cl.
*B22F 9/24* (2006.01)
*H01B 1/22* (2006.01)
(Continued)

(52) U.S. Cl.
CPC .............. *B22F 9/24* (2013.01); *B22F 1/0014* (2013.01); *B23K 35/025* (2013.01);
(Continued)

(58) Field of Classification Search
None
See application file for complete search history.

(56) References Cited

U.S. PATENT DOCUMENTS 7,955,411 B2   6/2011 Yasuda et al.
8,287,617 B2  10/2012 Nakatani
(Continued)

FOREIGN PATENT DOCUMENTS

JP       H04-176806 A    6/1992
JP       H10-330809 A   12/1998
(Continued)

OTHER PUBLICATIONS

Extended European Search Report issued by the European Patent Office dated Oct. 25, 2018, which corresponds to EP16759043.9-1103 and is related to U.S. Appl. No. 15/555,094.
(Continued)

*Primary Examiner* — George Wyszomierski
(74) *Attorney, Agent, or Firm* — Studebaker & Brackett PC

(57) ABSTRACT

A method for producing copper particles includes a preparation step and a heating step. In the preparation step, a copper compound, a salt of a main group metal, and a polyhydric alcohol are prepared. In the heating step, a mixture of the copper compound, the salt of the main group metal, and the polyhydric alcohol is heated. Preferably, the main group metal is at least one selected from the group consisting of lithium, beryllium, sodium, magnesium, aluminum, potassium, calcium, zinc, gallium, germanium, rubidium, strontium, cadmium, indium, tin, antimony, cesium, and barium.

8 Claims, 17 Drawing Sheets

(51) Int. Cl.
  *H01B 1/02* (2006.01)
  *B22F 1/00* (2006.01)
  *B23K 35/02* (2006.01)
  *B23K 35/30* (2006.01)

(52) U.S. Cl.
  CPC ............ *B23K 35/302* (2013.01); *H01B 1/02* (2013.01); *H01B 1/22* (2013.01); *B22F 2301/10* (2013.01)

(56) References Cited

U.S. PATENT DOCUMENTS

| | | | |
|---|---|---|---|
| 8,821,676 | B2 | 9/2014 | Yasuda et al. |
| 8,864,871 | B2 | 10/2014 | Lee et al. |
| 9,011,726 | B2 | 4/2015 | Nagano et al. |
| 2006/0236813 | A1* | 10/2006 | Zhao ................... B22F 9/24 75/711 |
| 2007/0108423 | A1* | 5/2007 | Brown ................... C03C 3/064 252/500 |
| 2008/0072706 | A1 | 3/2008 | Lee et al. |
| 2008/0173398 | A1 | 7/2008 | Yasuda et al. |
| 2009/0127518 | A1 | 5/2009 | Nagano et al. |
| 2009/0151512 | A1 | 6/2009 | Nakatani |
| 2011/0204125 | A1 | 8/2011 | Yasuda et al. |
| 2012/0104618 | A1 | 5/2012 | Yasuda et al. |
| 2017/0144220 | A1 | 5/2017 | Suganuma et al. |

FOREIGN PATENT DOCUMENTS

| | | | |
|---|---|---|---|
| JP | H11-006004 | A | 1/1999 |
| JP | H11-152506 | A | 6/1999 |
| JP | 2004225087 | A | 8/2004 |
| JP | 2005097677 | A | 4/2005 |
| JP | 2005307335 | A | 11/2005 |
| JP | 2005330552 | A | 12/2005 |
| JP | 2007291443 | A | 11/2007 |
| JP | 2008075181 | A | 4/2008 |
| JP | 2008161907 | A | 7/2008 |
| JP | 2009155674 | A | 7/2009 |
| JP | 2010150619 | A | 7/2010 |
| JP | 2013-161544 | A | 8/2013 |
| JP | 2014074115 | A | 4/2014 |
| JP | 2014152395 | A | 8/2014 |
| WO | 2007037440 | A1 | 4/2007 |
| WO | 2013008505 | A1 | 1/2013 |
| WO | 2013035366 | A1 | 3/2013 |
| WO | 2015194536 | A1 | 12/2015 |
| WO | WO-2016/044648 | A1 * | 3/2016 |

OTHER PUBLICATIONS

An Office Action mailed by the Korean Intellectual Property Office dated Nov. 8, 2018, which corresponds to Korean Patent Application No. 10-2017-7026270 and is related to U.S. Appl. No. 15/555,094.

An Office Action mailed by the State Intellectual Property Office of the People's Republic of China dated Nov. 19 2018, which corresponds to Chinese Patent Application No. 201680013251.0 and is related to U.S. Appl. No. 15/555,094.

Carroll, Kyler J. et al., "Preparation of Elemental Cu and Ni Nanoparticles by the Polyol Method: An Experimental and Theoretical Approach", The Journal of Physical Chemistry C, 2011, vol. 115, pp. 2656-2664.

International Search Report issued in PCT/JP2016/056851; dated May 17, 2016.

Jinting Jiu et al., "Simultaneous synthesis of nano and micro-Ag particles and their application as a die-attachment material", J Mater Sci: Mater Electron, Published online on Jun. 12, 2015, New York, 9 pages.

Andrew R. Siekkinen et al., "Rapid synthesis of small silver nanocubes by mediating polyol reduction with a trace amount of sodium sulfide or sodium hydrosulfide", Chemical Physics Letters, Oct. 2006, pp. 491-496.

* cited by examiner

METHOD FOR PRODUCING COPPER PARTICLES, COPPER PARTICLES, AND COPPER PASTE

TECHNICAL FIELD

The present invention relates to a method for producing copper particles, copper particles, and a copper paste.

BACKGROUND ART

A silver paste is known as a wiring material and a bonding material for electronic components. The silver paste is a paste obtained by dispersing conductive silver particles in an organic solvent. However, silver tends to cause an ion migration phenomenon. The ion migration phenomenon is the phenomenon that describes a short circuit in a wire of a metal on insulation that is caused by some of the metal migrating on the insulation. Also, silver is expensive and therefore unfit for industrial use.

A wiring material and a bonding material that can be substitutes for the silver paste have therefore been contemplated. For example, use of a copper paste has been contemplated. Copper particles included in the copper paste have electrical resistivity comparable to that of silver particles and tend not to cause the ion migration phenomenon compared to silver particles. Examples of methods for producing copper particles include a mechanical pulverization method and a vacuum method. The mechanical pulverization method involves pulverizing a mass of copper using a pulverizer. The vacuum method is for example a method such as disclosed in Patent Literature 1. More specifically, according to the vacuum method, copper is heated and evaporated in a reduced pressure environment. Subsequently, the resulting copper vapor is cooled thereby to condense and solidify the copper. Through the above, a colloid of copper particles is produced.

CITATION LIST

Patent Literature

[Patent Literature 1]
Japanese Patent Application Laid-Open Publication No. 2007-291443

SUMMARY OF INVENTION

Technical Problem

However, the mechanical pulverization method and the vacuum method provide low yields of copper particles, being unfit for mass production of copper particles. Also, the vacuum method involves complicated production processes and requires expensive equipment. Furthermore, it is difficult to control the particle size and the shape of resulting copper particles through the mechanical pulverization method and the vacuum method.

The present invention was achieved in consideration of the above problems and provides a method for producing copper particles while easily controlling the particle size and the shape of the copper particles. The present invention also provides copper particles having a particle size and a shape that easily improve the packing density of the copper particles (hereinafter, referred to as "copper particle packing characteristics"). The present invention further provides a copper paste exhibiting increased bonding strength as including copper particles having a particle size and a shape that easily improve the copper particle packing characteristics.

Solution to Problem

A method for producing copper particles according to the present invention includes a preparation step and a heating step. In the preparation step, a copper compound, a salt of a main group metal, and a polyhydric alcohol are prepared. In the heating step, a mixture of the copper compound, the salt of the main group metal, and the polyhydric alcohol is heated.

In an embodiment, the main group metal is at least one selected from the group consisting of lithium, beryllium, sodium, magnesium, aluminum, potassium, calcium, zinc, gallium, germanium, rubidium, strontium, cadmium, indium, tin, antimony, cesium, and barium.

In an embodiment, the salt is a salt having a sulfur atom-containing anion or a salt having an oxygen atom-containing anion.

In an embodiment, the copper particles having different particle size distribution are obtained by changing a molar concentration of the salt of the main group metal relative to a volume of the mixture. The particle size distribution is measured by dynamic light scattering.

In an embodiment, the copper particles have a characteristic (I) or (II) shown below in their particle size distribution as measured by dynamic light scattering. (I) The particle size distribution has a peak in a range of particle sizes of greater than or equal to 1,000 nm. The particle size distribution has no peak in a range of particle sizes of less than 1,000 nm. (II) The particle size distribution has two peaks or more. One of the two peaks is in a range of particle sizes of less than 1,000 nm. The other of the two peaks is in a range of particle sizes of greater than or equal to 1,000 nm.

In an embodiment, in the heating step, the copper particles having the characteristic (I) are obtained by increasing a molar concentration of the salt of the main group metal from a first molar concentration to a second molar concentration. Alternatively, in the heating step, the copper particles having the characteristic (I) are obtained by decreasing the molar concentration of the salt of the main group metal from a third molar concentration to the second molar concentration. The second molar concentration is a molar concentration of the salt of the main group metal relative to a volume of the mixture for producing the copper particles having the characteristic (I). The first molar concentration is lower than the second molar concentration. The third molar concentration is higher than the second molar concentration.

In an embodiment, in the heating step, the copper particles having the characteristic (II) are obtained by increasing a molar concentration of the salt of the main group metal from a second molar concentration to a third molar concentration. The second molar concentration is a molar concentration of the salt of the main group metal relative to a volume of the mixture for producing the copper particles having the characteristic (I). The third molar concentration is higher than the second molar concentration.

In an embodiment, the copper compound is at least one selected from the group consisting of copper hydroxide, copper nitrate, copper sulfate, copper carbonate, copper formate, copper acetate, and copper sulfide.

In an embodiment, the copper particles having different shapes are obtained by changing a type of the copper compound.

In an embodiment, the polyhydric alcohol is at least one selected from the group consisting of ethylene glycol, diethylene glycol, triethylene glycol, tetraethylene glycol, propanediol, butanediol, pentanediol, glucose, and glycerin.

In an embodiment, the copper particles having different shapes are obtained by changing a type of the polyhydric alcohol.

In an embodiment, a maximum particle size of the copper particles as measured by dynamic light scattering is decreased by increasing a temperature of the heating of the mixture. Alternatively, the maximum particle size of the copper particles as measured by dynamic light scattering is increased by decreasing the temperature of the heating of the mixture.

In an embodiment, the salt of the main group metal has a molar concentration of greater than 0 μM and no greater than 300 μM relative to a volume of the mixture.

The copper particles according to the present invention have a characteristic (I) or (III) shown below in their particle size distribution as measured by dynamic light scattering. (I) The particle size distribution has a peak in a range of particle sizes of greater than or equal to 1,000 nm. The particle size distribution has no peak in a range of particle sizes of less than 1,000 nm. (III) The particle size distribution has two peaks or more. One of the two peaks is in a range of particle sizes of less than 1,000 nm. The other of the two peaks is in a range of particle sizes of greater than or equal to 1,000 nm. A ratio of a maximum value of a scattering intensity distribution associated with the other peak in the range of particle sizes of greater than or equal to 1,000 nm to a maximum value of the scattering intensity distribution associated with the one peak in the range of particle sizes of less than 1,000 nm is at least 0.3 and no greater than 1.5.

A copper paste according to the present invention includes copper particles produced through any of the above-described methods or the above-described copper particles.

Advantageous Effects of Invention

The method for producing copper particles according to the present invention enables easy control of the particle diameter and the shape of the copper particles. The copper particles according to the present invention can have a particle size and a shape that easily improve the copper particle packing characteristics. The copper paste according to the present invention can have increased bonding strength as including the copper particles having a particle size and a shape that easily improve the copper particle packing characteristics.

DESCRIPTION OF EMBODIMENTS

Figure 1:
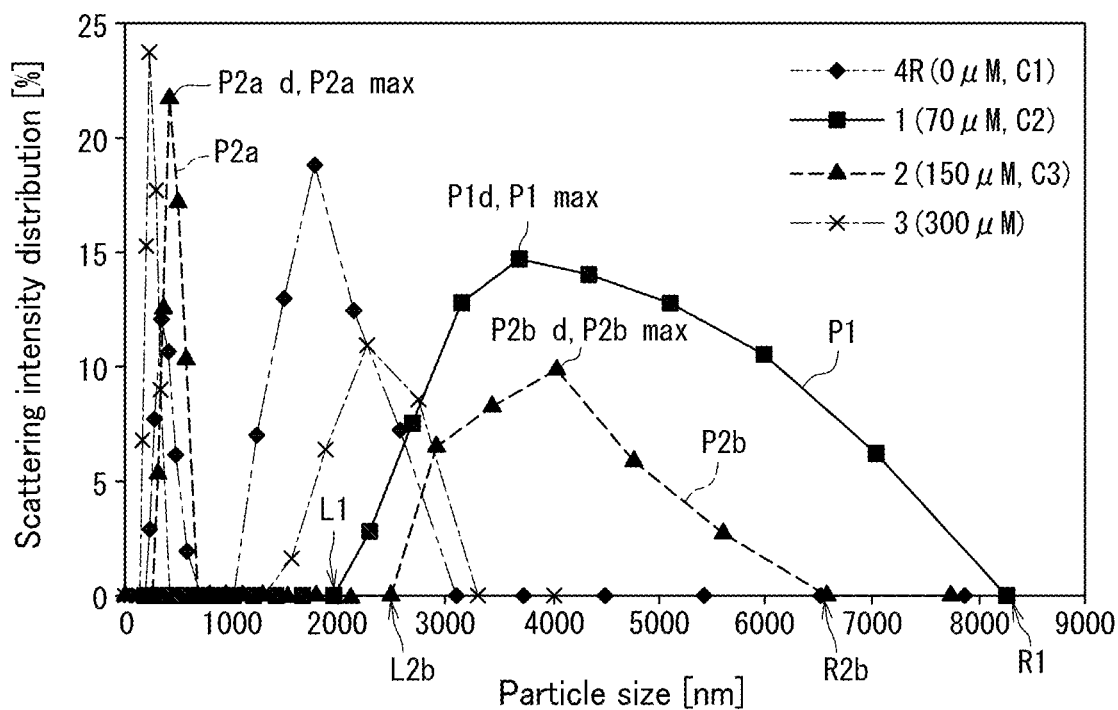
FIG. 1 is a diagram illustrating examples of particle size distributions of copper particles produced through a production method according to an embodiment of the present invention.

The following describes an embodiment of the present invention. However, the present invention is not in any way limited by the following embodiment. Appropriate changes may be made to practice the present disclosure so long as such changes are within the intended scope of the present invention. Although description is omitted as appropriate in some instances in order to avoid repetition, such omission does not limit the gist of the present disclosure.

An embodiment of the present invention relates to a method for producing copper particles. The production method according to the present embodiment includes a preparation step and a heating step. In the heating step, a mixture of a copper compound, a salt of a main group metal, and a polyhydric alcohol is heated. Thus, the particle size and the shape of resulting copper particles can be readily controlled. The reason for the above is thought to be as follows.

For convenience of description, the following describes an example in which ethylene glycol is used as the polyhydric alcohol and a divalent copper compound is used as the copper compound. First, in the heating step, acetaldehyde is produced through dehydration of ethylene glycol (Reaction Formula 1). Diacetyl is produced through oxidation of the acetaldehyde produced. During oxidation, acetaldehyde emits electrons. The emitted electrons reduce copper ions ($Cu^{2+}$) to afford copper atoms (Cu) (Reaction Formula 2). Next, copper atoms (Cu) are bonded to each other to form copper particle cores. Copper atoms (Cu) are further bonded to the copper particle cores to form copper particles. The salt of the main group metal is present as cations and anions in the reaction system. It is therefore thought that copper atoms (Cu) are attracted to each other by the action of the cations and the anions from the salt of the main group metal in the formation of the copper particle cores and in the formation of the copper particles. Thus, it is thought that the use of the salt of the main group metal enables control of the particle size and the shape of the copper particles.

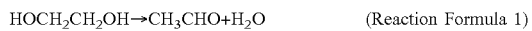
(Reaction Formula 1)

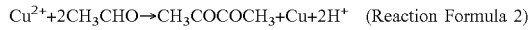
(Reaction Formula 2)

The following describes the copper compound, the salt of the main group metal, and the polyhydric alcohol that are used in the preparation step and the heating step. The following also describes an additive that may be optionally included in the mixture in the heating step. The following further describes the copper particles that are produced through the production method according to the present embodiment.

<1. Copper Compound>

No particular limitations are placed on the copper compound other than being reducible by the polyhydric alcohol. Examples of copper compounds include a salt of copper and an oxide of copper. The salt of copper is for example at least one selected from the group consisting of copper hydroxides, copper nitrates, copper sulfates, copper carbonates, copper formates, copper acetates, and copper sulfides. The oxide of copper is for example cupric oxide or cuprous oxide. The copper compound may be a hydrate of a copper compound. Preferably, the copper compound is at least one of a copper hydroxide and a copper nitrate.

The copper compound is preferably contained in an amount of greater than 0 parts by mass and no greater than 5 parts by mass relative to 100 parts by mass of the mixture in the heating step, and more preferably at least 0.3 parts by mass and no greater than 3 parts by mass.

<2. Salt of Main Group Metal>

The production method according to the present embodiment enables easy control of the particle size and the shape of resulting copper particles through the use of a salt of a main group metal. It is thought that copper atoms (Cu) are attracted to each other by the action of cations and anions from the salt of the main group metal in the formation of the copper particle cores and in the formation of the copper particles.

The main group metal in the salt of the main group metal is for example at least one main group metal selected from the group consisting of lithium, beryllium, sodium, magnesium, aluminum, potassium, calcium, zinc, gallium, germanium, rubidium, strontium, cadmium, indium, tin, antimony, cesium, and barium. In terms of easily controlling the particle size and the shape of resulting copper particles, the main group metal is preferably at least one selected from the group consisting of sodium, potassium, calcium, and zinc, and more preferably sodium.

The salt of the main group metal is preferably a salt having a sulfur atom-containing anion (a salt formed from a sulfur atom-containing anion) or a salt having an oxygen atom-containing anion (a salt formed from an oxygen atom-containing anion) in terms of easily controlling the particle size and the shape of resulting copper particles. The salt having an oxygen atom-containing anion preferably contains no sulfur atom. Examples of the salt having a sulfur atom-containing anion include sulfides, hydrogen sulfides, sulfates, sulfites, and hyposulfites. Examples of the salt having an oxygen atom-containing anion include hydroxides, carbonates, acetates, and bicarbonates. The salt of the main group metal is preferably a salt having a sulfur atom-containing anion, more preferably at least one selected from the group consisting of sulfides, hydrogen sulfides, sulfates, sulfites, and hyposulfites, and particularly preferably a sulfide.

The salt of the main group metal may be an anhydrate or a hydrate. One salt of a main group metal may be used independently, or two or more salts of main group metals may be used in combination.

<3. Polyhydric Alcohol>

The polyhydric alcohol for example acts as a reductant for the copper compound and also acts as a solvent. The use of the polyhydric alcohol tends to inhibit oxidation of the copper particles in the polyhydric alcohol.

No particular limitations are placed on the polyhydric alcohol other than being capable of reducing the copper compound. Examples of polyhydric alcohols include ethylene glycol, diethylene glycol, triethylene glycol, tetraethylene glycol, propanediol (specific examples include 1,2-propanediol and 1,3-propanediol), butanediol, pentanediol, glucose, and glycerin. Any one of the polyhydric alcohols listed above may be used independently, or any two or more of the polyhydric alcohols listed above may be used in combination. Preferably, the polyhydric alcohol is at least one selected from the group consisting of ethylene glycol, propanediol, butanediol, and glycerin. More preferably, the polyhydric alcohol is at least one of butanediol and ethylene glycol.

The polyhydric alcohol is preferably contained in an amount of at least 10 parts by mass and no greater than 300 parts by mass relative to 1.5 parts by mass of the copper compound, and more preferably at least 80 parts by mass and no greater than 150 parts by mass. Furthermore, the polyhydric alcohol is preferably contained in an amount of at least 50 parts by mass and less than 100 parts by mass relative to 100 parts by mass of the mixture in the heating step, and more preferably at least 70 parts by mass and no greater than 99 parts by mass.

In a situation in which the polyhydric alcohol is used as a solvent, an optional solvent other than the polyhydric alcohol may be contained, as necessary, in the mixture of the copper compound, the salt of the main group metal, and the polyhydric alcohol. The optional solvent is for example water. Furthermore, in order to change the rate of reduction of the copper compound, a high-boiling polar solvent may be contained as the optional solvent. Examples of high-boiling polar solvents include dimethyl formamide, N-methylpyrrolidone, and ethyleneglycol monomethyl ether. The optional solvent is preferably contained in an amount of no greater than 40 parts by mass relative to 100 parts by mass of the polyhydric alcohol, and more preferably no greater than 10 parts by mass. Particularly preferably, the optional solvent is not contained.

<4. Additive>

An additive may be added to the mixture of the copper compound, the salt of the main group metal, and the polyhydric alcohol as necessary. Examples of additives include reductants and dispersants. Examples of reductants include ethanol, ascorbic acid, sodium borohydride, and hydrazine. Examples of dispersants include polyvinylpyrrolidone (PVP), cetyltrimethylammonium bromide (CTAB), sodium lauryl sulfate (SLS), sodium dodecyl sulfate (SDS), polyethylene glycol (PEG), polyvinyl alcohol (PVA), and gelatin.

In a situation in which a dispersant is contained in the mixture, the dispersant is preferably contained in an amount of greater than 0 parts by mass and no greater than 5 parts by mass relative to 100 parts by mass of the mixture, and more preferably at least 0.3 parts by mass and no greater than 3 parts by mass.

<5. Copper Particles>

The copper particles produced through the production method according to the present embodiment tend to have a desired particle size (for example, particle size distribution) or a desired shape.

<5-1. Particle Size Distribution of Copper Particles>

The following describes particle size distributions of the copper particles with reference to FIG. 1. In FIG. 1, the horizontal axis represents particle size [nm] of the copper particles, and the vertical axis represents scattering intensity distribution (intensity distribution of scattered light) [%]. FIG. 1 shows peaks P1, P2$a$, and P2$b$ of the particle size distributions of the copper particles. The peak P1 is a convex curve in a situation in which the particle size distribution curve of the copper particles has one convex curve. A particle size R1 of the copper particles at a right end of the peak P1 (convex curve) and a particle size L1 of the copper particles at a left end of the peak P1 (convex curve) are confirmed from the peak P1 (convex curve). The particle sizes R1 and L1 are each a particle size at a point where the peak P1 (convex curve) intersects with the horizontal axis in the particle size distribution of the copper particles. The peak P2$a$ is one of convex curves in a situation in which the particle size distribution curve of the copper particles has two convex curves or more, and the particle size at a highest point of this convex curve is less than 1,000 nm. The peak P2$b$ is one of convex curves in a situation in which the particle size distribution curve of the copper particles has two convex curves or more, and the particle size at a highest point of this convex curve is greater than or equal to 1,000 nm. A particle size R2$b$ of the copper particles at a right end of the peak P2$b$ (convex curve) and a particle size L2$b$ of the copper particles at a left end of the peak P2$b$ (convex curve) are confirmed from the peak P2$b$ (convex curve). The particle sizes R2$b$ and L2$b$ are each a particle size at a point where the peak P2$b$ (convex curve) intersects with the horizontal axis in the particle size distribution of the copper particles. P1$_{max}$, P2$a_{max}$, and P2$b_{max}$ are respectively a maximum value of the scattering intensity distribution associated with the peak P1 (a vertical axis value at a highest point of the peak P1), a maximum value of the scattering intensity distribution associated with the peak P2$a$ (a vertical axis value at a highest point of the peak P2$a$), and a maximum value of the scattering intensity distribution associated with the peak P2$b$ (a vertical axis value at a highest point of the peak P2$b$). P1$_d$, P2$a_d$, and P2$b_d$ are respectively a particle size corresponding to the maximum value of the scattering intensity distribution associated with the peak P1 (a horizontal axis value at the highest point of the peak P1), a particle size corresponding to the maximum value of the scattering intensity distribution associated with the peak P2$a$ (a horizontal axis value at the highest point of the peak P2$a$), and a particle size corresponding to the maximum value of the scattering intensity distribution associated with the peak P2$b$ (a horizontal axis value at the highest point of the peak P2$b$).

Preferably, the copper particles have a characteristic (I) or (II) in their particle size distribution.

Characteristic (I): The particle size distribution has the peak P1 in a range of particle sizes of greater than or equal to 1,000 nm. The particle size distribution has no peak in a range of particle sizes of less than 1,000 nm.

Characteristic (II): The particle size distribution has the two peaks P2$a$ and P2$b$ or more. One of the two peaks (peak P2$a$) is in a range of particle sizes of less than 1,000 nm. The other of the two peaks (peak P2$b$) is in a range of particle sizes of greater than or equal to 1,000 nm.

More preferably, the copper particles have the aforementioned characteristic (I) or a characteristic (III) in their particle size distribution. The characteristic (III) is a preferred form of the characteristic (II).

Characteristic (III): The particle size distribution has the two peaks P2$a$ and P2$b$ or more. One of the two peaks (peak P2$a$) is in a range of particle sizes of less than 1,000 nm. The other of the two peaks (peak P2$b$) is in a range of particle sizes of greater than or equal to 1,000 nm. A ratio (P2$b_{max}$/P2$a_{max}$) of the maximum value P2$b_{max}$ of the scattering intensity distribution associated with the peak P2$b$ to the maximum value P2$a_{max}$ of the scattering intensity distribution associated with the peak P2$a$ is at least 0.3 and no greater than 1.5.

Still more preferably, the copper particles have the aforementioned characteristic (I) or a characteristic (IV) in their particle size distribution. The characteristic (IV) is a preferred form of the characteristic (III).

Characteristic (IV): The particle size distribution has the two peaks P2$a$ and P2$b$ or more. One of the two peaks (peak P2$a$) is in a range of particle sizes of less than 1,000 nm. The other of the two peaks (peak P2$b$) is in a range of particle sizes of greater than or equal to 1,000 nm. A ratio (P2$b_{max}$/P2$a_{max}$) of the maximum value P2$b_{max}$ of the scattering intensity distribution associated with the peak P2$b$ to the maximum value P2$a_{max}$ of the scattering intensity distribution associated with the peak P2$a$ is at least 0.3 and no greater than 1.5. A difference (R2$b$–L2$b$) between the particle size R2$b$ at the right end of the peak P2$b$ and the particle size L2$b$ at the left end of the peak P2$b$ is at least 2,500 nm.

Herein, the peak P1 in a range of particle sizes of greater than or equal to 1,000 nm means that the highest point of the peak P1 is in a range of particle sizes of greater than or equal to 1,000 nm. That is, the peak P1 in a range of particle sizes of greater than or equal to 1,000 nm means that the particle size $P1_d$ corresponding to the maximum value of the scattering intensity distribution associated with the peak P1 (the horizontal axis value at the highest point of the peak P1) is greater than or equal to 1,000 nm. The particle size distribution having no peak in a range of particle sizes of less than 1,000 nm means that there is no peak that has a highest point in a range of particle sizes of less than 1,000 nm. The peak P2a in a range of particle sizes of less than 1,000 nm means that the highest point of the peak P2a is in a range of particle sizes of less than 1,000 nm. That is, the peak P2a in a range of particle sizes of less than 1,000 nm means that the particle size $P2a_d$ corresponding to the maximum value of the scattering intensity distribution associated with the peak P2a (the horizontal axis value at the highest point of the peak P2a) is less than 1,000 nm. The peak P2b in a range of particle sizes of greater than or equal to 1,000 nm means that the highest point of the peak P2b is in a range of particle sizes of greater than or equal to 1,000 nm. That is, the peak P2b in a range of particle sizes of greater than or equal to 1,000 nm means that the particle size $P2b_d$ corresponding to the maximum value of the scattering intensity distribution associated with the peak P2b (the horizontal axis value at the highest point of the peak P2b) is greater than or equal to 1,000 nm.

As a result of having the characteristic (I), the copper particles have a moderately large particle size. Thus, the copper paste including such copper particles tends to provide improved copper particle packing characteristics when, for example, sintered on a substrate. As a result, the copper paste including such copper particles tends to have increased bonding strength. Furthermore, a sintered layer including such copper particles tends not to be broken.

Preferably, the copper particles having the characteristic (I) have only the peak P1 (only one peak) in their particle size distribution. More preferably, a difference (R1−L1) between the particle size R1 at the right end of the peak P1 and the particle size L1 at the left end of the peak P1 of the copper particles having the characteristic (I) is at least 2,500 nm. In other words, the peak P1 is preferably a broad peak. Thus, the copper particles having a particle size of at least 1,000 nm, which are involved in the peak 1, have moderately non-uniform particle sizes. It is thought that as a result, interstices between the copper particles having a particle size of greater than or equal to 1,000 nm, which are involved in the peak P1, are reduced. Thus, the copper paste including such copper particles tends to provide further improved copper particle packing characteristics when, for example, sintered on a substrate.

As a result of having the characteristic (II), the copper particles having a particle size of less than 1,000 nm, which are involved in the peak P2a, serve to fill the interstices between the copper particles having a particle size of greater than or equal to 1,000 nm, which are involved in the peak P2b. Thus, the copper paste including such copper particles tends to provide improved copper particle packing characteristics when, for example, sintered on a substrate. As a result, the copper paste including such copper particles tends to have increased bonding strength.

The copper particles having the characteristic (III) also have the following characteristic in addition to the characteristic (II). More specifically, the ratio ($P2b_{max}/P2a_{max}$) of the maximum value $P2b_{max}$ of the scattering intensity distribution associated with the peak P2b to the maximum value $P2a_{max}$ of the scattering intensity distribution associated with the peak P2a is at least 0.3 and no greater than 1.5. Preferably, the ratio ($P2b_{max}/P2a_{max}$) is at least 0.4 and no greater than 1.2. The ratio ($P2b_{max}/P2a_{max}$) within the above-specified range tends to provide a good balance between the amount of the copper particles having a particle size of greater than or equal to 1,000 nm, which are involved in the peak P2b, and the amount of the copper particles having a particle size of less than 1,000 nm, which are involved in the peak P2a. As a result, the copper particles having a particle size of less than 1,000 nm readily fill the interstices between the copper particles having a particle size of greater than or equal to 1,000 nm. Thus, the copper paste including such copper particles tends to provide further improved copper particle packing characteristics when, for example, sintered on a substrate.

The copper particles having the characteristic (IV) also have the following characteristic in addition to the characteristic (III). More specifically, the difference (R2b−L2b) between the particle size R2b at the right end of the peak P2b and the particle size L2b at the left end of the peak P2b is at least 2,500 nm. In other words, the peak P2b is a broad peak. Thus, the copper particles involved in the peak P2b have moderately non-uniform particle sizes. It is thought that as a result, the interstices between the copper particles having a particle size of greater than or equal to 1,000 nm, which are involved in the peak P2b, are reduced. More effectively, therefore, the copper particles having a particle size of less than 1,000 nm, which are involved in the peak P2a, serve to fill the reduced interstices between the copper particles having a particle size of greater than or equal to 1,000 nm. Thus, the copper paste including such copper particles tends to provide further improved copper particle packing characteristics when, for example, sintered on a substrate.

It is also preferable that the copper particles have a characteristic (V). The characteristic (V) is another preferred form that is different from any of the characteristics (I), (II), (III), and (IV).

Characteristic (V): The particle size distribution has the peak P1 in a range of particle sizes of less than 1,000 nm and has no peak in a range of particle sizes of greater than or equal to 1,000 nm. The difference (R1−L1) between the particle size R1 at the right end of the peak P1 and the particle size L1 at the left end of the peak P1 is at least 2,000 nm.

As a result of the copper particles having the characteristic (V), the peak P1 is a broad peak. Thus, the copper particles involved in the peak P1 have moderately non-uniform particle sizes. It is thought that as a result, interstices between the copper particles are reduced and the copper particle packing characteristics are improved. In a situation in which the copper particles have the characteristic (V), the difference (R1−L1) between the particle size R1 at the right end of the peak P1 and the particle size L1 at the left end of the peak P1 is preferably at least 2,000 nm and no greater than 3,000 nm.

The copper particles preferably have the characteristic (I), (II), or (V) in their particle size distribution, more preferably the characteristic (I) or (II), and particularly preferably the characteristic (II). Still more preferably, the copper particles have the characteristic (III) instead of the characteristic (II) in their particle size distribution, and far still more preferably the characteristic (IV) instead of the characteristic (II). Through the copper particle production method according to the present embodiment, it is possible to obtain the copper particles having the characteristic (I), the characteristic (II)

(preferably the characteristic (III), and more preferably the characteristic (IV)), or the characteristic (V) at a time through simple processes.

The particle size distribution and the later-described maximum particle size of the copper particles are measured by dynamic light scattering using a particle size distribution measuring device ("particle size measurement system ELS-Z2", product of Otsuka Electronics Co., Ltd.). A measurement method and measurement conditions of the particle size distribution and the maximum particle size of the copper particles will be described later in description of examples. The following describes a principle of the dynamic light scattering. The copper particles in a solution undergo Brownian motion dependent on particle sizes of the copper particles. Scattered light obtained by irradiating light onto the copper particles shows fast fluctuations in the case of copper particles having smaller diameters and slow fluctuations in the case of copper particles having larger diameters. The fluctuations of the scattered light are analyzed by a photon correlation method to determine particle sizes of the copper particles.

The copper particles may contain an atom (for example, a sulfur atom) derived from the salt of the main group metal. In a situation in which the copper particles contain an atom derived from the salt of the main group metal, the atom derived from the salt of the main group metal is preferably present in cores (central parts) of the respective copper particles. In such a situation, the copper particles preferably have the characteristic (I), (II), or (V) in their particle size distribution, more preferably the characteristic (I) or (II), and particularly preferably the characteristic (II). Still more preferably, the copper particles have the characteristic (III) instead of the characteristic (II) in their particle size distribution, and far still more preferably the characteristic (IV) instead of the characteristic (II).

The copper particles preferably have a particle size of at least 100 nm and no greater than 10,000 nm, and more preferably at least 200 nm and no greater than 9,000 nm. As a result of the copper particles having a particle size of at least 100 nm, the copper paste containing such copper particles yields, when sintered on a substrate, a sintered layer containing the copper particles that tends not to be broken. At the same time, as a result of the copper particles having a particle size of no greater than 10,000 nm, the copper particles tend to have improved copper particle packing characteristics.

<5-2. Molar Concentration of Salt of Main Group Metal and Particle Size Distribution of Copper Particles>

The copper particles having different particle size distribution can be obtained by changing the molar concentration (μM, in other words μmol/L) of the salt of the main group metal relative to the volume of the mixture in the heating step. In a situation in which the mixture includes an additional component other than the copper compound, the salt of the main group metal, and the polyhydric alcohol, the volume of the mixture refers to the volume of the mixture including the additional component overall. The following describes a relationship between the molar concentration of the salt of the main group metal and the particle size distribution of resulting copper particles with reference to FIGS. 1 and 2.

FIG. 1 illustrates particle size distributions of the copper particles. The copper particles are produced using copper hydroxide (Cu(OH)$_2$) as the copper compound, sodium sulfide pentahydrate (Na$_2$S.5H$_2$O) as the salt of the main group metal, and 1,3-propanediol as the polyhydric alcohol. In FIG. 1, 0 μM, 70 μM, 150 μM, and 300 μM are each the molar concentration of the salt of the main group metal. The molar concentration is based on the volume of the mixture in the heating step. Rhombuses on the plot show a particle size distribution of the copper particles that is obtained using the mixture to which no salt of a main group metal (concentration: 0 μM) is added. Squares on the plot, triangles on the plot, and crosses on the plot respectively show particle size distributions of the copper particles that are obtained using the mixture having a main group metal salt concentration of 70 μM, the mixture having a main group metal salt concentration of 150 μM, and the mixture having a main group metal salt concentration of 300 μM as a result of addition of the main group metal salt to give each concentration relative to the volume of the corresponding mixture.

Figure 2:
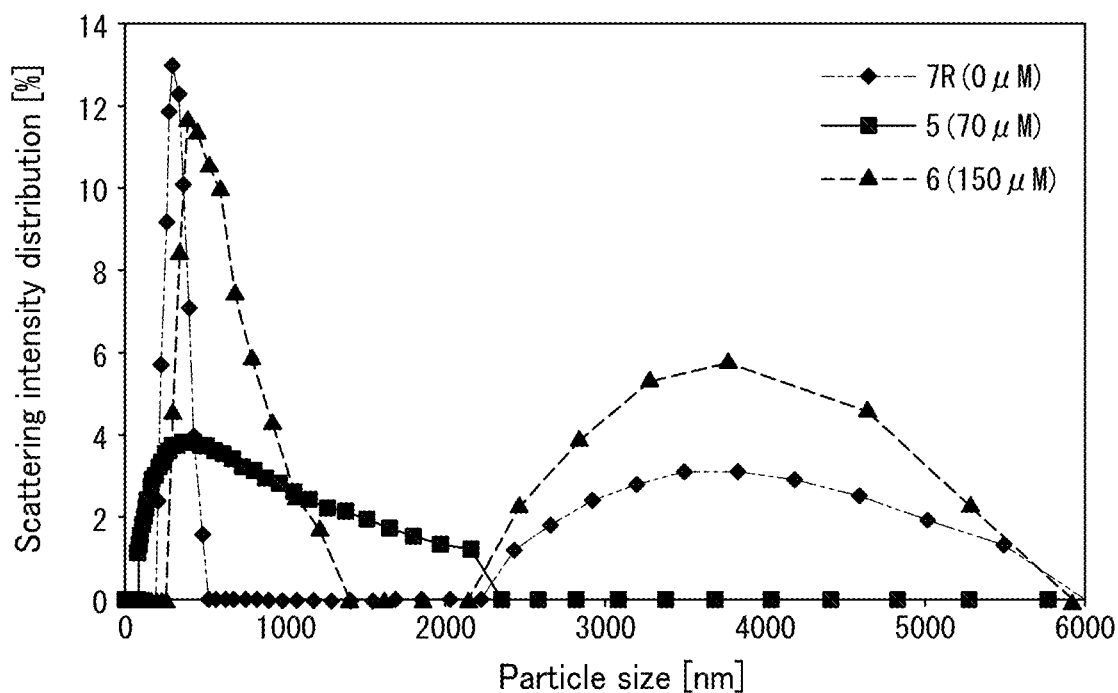
FIG. 2 is a diagram illustrating other examples of particle size distributions of copper particles produced through the production method according to the embodiment of the present invention.
Figure 3A:
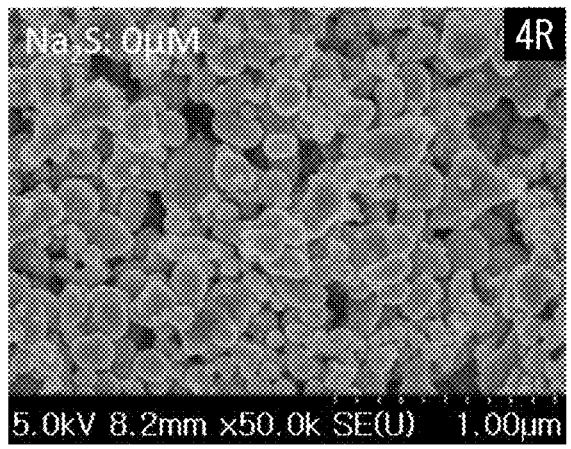
FIG. 3A is a photograph showing an example of a scanning electron microscope (SEM) image of copper particles produced without addition of a salt of a main group metal.
Figure 3B:
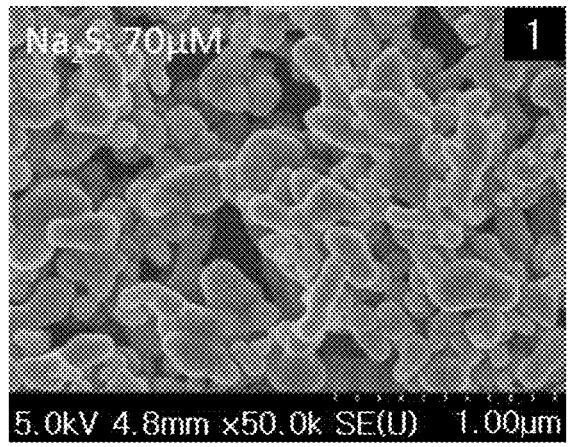
FIGS. 3B, 3C, and 3D are photographs each showing an example of an SEM image of copper particles produced through the production method according to the embodiment of the present invention.
Figure 3C:
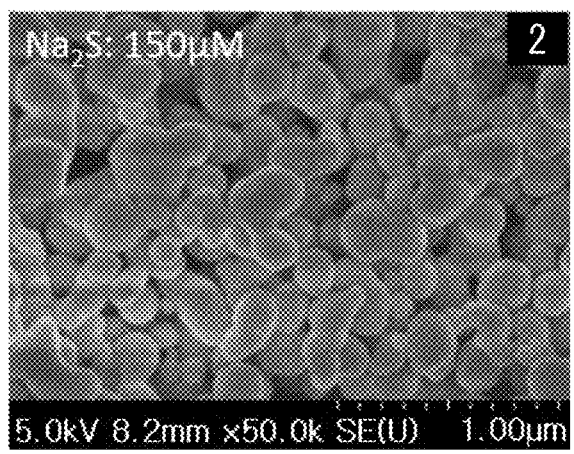
Figure 3D:
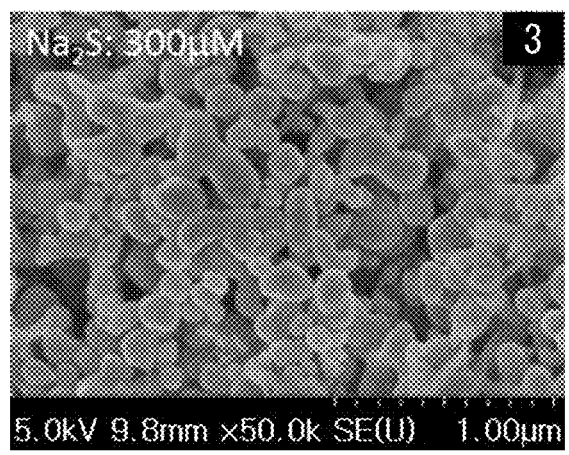

FIG. 2 illustrates particle size distributions of the copper particles. The copper particles are produced using copper hydroxide (Cu(OH)$_2$) as the copper compound, sodium sulfide pentahydrate (Na$_2$S.5H$_2$O) as the salt of the main group metal, and ethylene glycol as the polyhydric alcohol. In FIG. 2, the horizontal axis represents particle size [nm] of the copper particles, and the vertical axis represents scattering intensity distribution [%]. In FIG. 2, 0 μM, 70 μM, and 150 μM are each the molar concentration of the salt of the main group metal. The molar concentration is based on the volume of the mixture in the heating step. Rhombuses on the plot show a particle size distribution of the copper particles that is obtained using the mixture to which no salt of a main group metal (concentration: 0 μM) is added. Squares on the plot and triangles on the plot respectively show the particle size distributions of the copper particles that are obtained using the mixture having a main group metal salt concentration of 70 μM and the mixture having a main group metal salt concentration of 150 μM as a result of addition of the salt of the main group metal to give each concentration relative to the volume of the corresponding mixture.

The copper particles obtained as described below have the characteristic (I) in their particle size distribution. For example, as illustrated in FIG. 1, the copper particles obtained using 1,3-propanediol as the polyhydric alcohol and sodium sulfide pentahydrate (Na$_2$S.5H$_2$O) in a concentration of 70 μM relative to the volume of the mixture has the characteristic (I) in their particle size distribution.

The copper particles obtained as described below have the characteristic (II) and the characteristic (III) in their particle size distributions. For example, as illustrated in FIG. 1, the copper particles obtained using 1,3-propanediol as the polyhydric alcohol and sodium sulfide pentahydrate (Na$_2$S.5H$_2$O) in a concentration of 150 μM relative to the volume of the mixture, and the copper particles obtained using 1,3-propanediol as the polyhydric alcohol and sodium sulfide pentahydrate (Na$_2$S.5H$_2$O) in a concentration of 300 μM relative to the volume of the mixture have the characteristic (II) and the characteristic (III) in their particle size distribution. As illustrated in FIG. 2, the copper particles obtained using ethylene glycol as the polyhydric alcohol and sodium sulfide pentahydrate (Na$_2$S.5H$_2$O) in a concentration of 150 μM relative to the volume of the mixture have the characteristic (II) and the characteristic (III) in their particle size distribution.

The copper particles obtained as described below have the characteristic (IV) in their particle size distribution. For example, as illustrated in FIG. 1, the copper particles obtained using 1,3-propanediol as the polyhydric alcohol and sodium sulfide pentahydrate (Na$_2$S.5H$_2$O) in a concentration of 150 μM relative to the volume of the mixture have the characteristic (IV) in their particle size distribution. As illustrated in FIG. 2, the copper particles obtained using ethylene glycol as the polyhydric alcohol and sodium sulfide pentahydrate ($Na_2S.5H_2O$) in a concentration of 150 μM relative to the volume of the mixture have the characteristic (IV) in their particle size distribution.

The copper particles having different particle size distribution can be obtained by increasing or decreasing the molar concentration of the salt of the main group metal relative to the volume of the mixture in the heating step. The following describes a relationship between increasing and decreasing the molar concentration of the salt of the main group metal and the particle size distribution of resulting copper particles.

In FIG. 1, C1, C2, and C3 respectively indicate a first molar concentration, a second molar concentration, and a third molar concentration. The second molar concentration C2 is the molar concentration of the salt of the main group metal (for example, sodium sulfide pentahydrate 70 μM) relative to the volume of the mixture for producing the copper particles having the characteristic (I). The first molar concentration C1 (for example, 0 μM) is lower than the second molar concentration C2 (for example, 70 μM). The third molar concentration C3 (for example, 150 μM) is higher than the second molar concentration C2 (for example, 70 μM).

For example, the copper particles having the characteristic (I) are obtained by increasing the molar concentration of the salt of the main group metal from the first molar concentration C1 to the second molar concentration C2. For another example, the copper particles having the characteristic (I) are obtained by decreasing the molar concentration of the salt of the main group metal from the third molar concentration C3 to the second molar concentration C2.

For another example, the copper particles having the characteristic (II) are obtained by increasing the molar concentration of the salt of the main group metal from the second molar concentration C2 to the third molar concentration C3.

It is thought that bonding between copper atoms (Cu) is accelerated by the action of the salt of the main group metal to increase the particle size of the copper particles with an increase in the molar concentration of the salt of the main group metal relative to the volume of the mixture. However, it is thought that once the molar concentration of the salt of the main group metal relative to the volume of the mixture exceeds a specific level, separation of copper atoms (Cu) from the copper particles may be caused at the same time as the bonding between copper atoms (Cu) by the influence of the molar concentration of the salt of the main group metal.

The molar concentration of the salt of the main group metal is preferably greater than 0 μM and no greater than 300 μM relative to the volume of the mixture, more preferably at least 50 μM and no greater than 300 μM, and particularly preferably at least 50 μM and no greater than 250 μM. In order to obtain the copper particles having the characteristic (I), the molar concentration of the salt of the main group metal is preferably at least 50 μM and less than 100 μM relative to the volume of the mixture. In order to obtain the copper particles having the characteristic (II) (preferably the characteristic (III), more preferably the characteristic (IV)), the molar concentration of the salt of the main group metal is preferably at least 100 μM and no greater than 300 μM relative to the volume of the mixture, and more preferably at least 100 μM and no greater than 250 μM. As a result of the molar concentration of the salt of the main group metal being within the above-specified range, resulting copper particles tend to have a particle size distribution that provides excellent copper particle packing characteristics.

<5-3. Shape of Copper Particles>

Examples of shapes of the copper particles include spheres, joining spheres, convex polyhedra, and convex polyhedra having curved vertices and edges.

The following describes a relationship between the type of the copper compound or the type of the polyhydric alcohol and the shape of the copper particles with reference to FIGS. 3A-5C. FIGS. 3A-5C each show an SEM image of the copper particles produced through the production method according to the present embodiment. Each tick in FIGS. 3A-5C is spaced 1.00 μm apart. The SEM images are obtained through observation of the copper particles at a magnification of ×50,000 using an SEM ("Ultra-High-Resolution Cold-Field-Emission Scanning Electron Microscope SU8020", product of Hitachi High-Technologies Corporation).

The copper particles shown in FIGS. 3A-3D are produced using copper hydroxide ($Cu(OH)_2$) as the copper compound, sodium sulfide pentahydrate ($Na_2S.5H_2O$) as the salt of the main group metal, and 1,3-propanediol as the polyhydric alcohol.

Figure 4A:
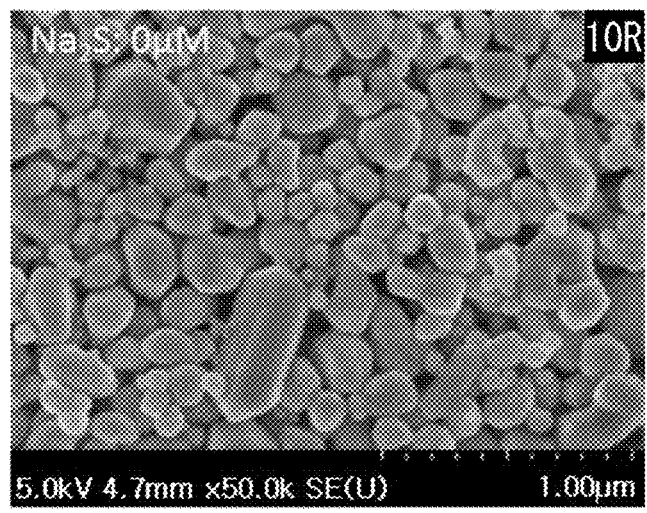
FIG. 4A is a photograph showing another example of an SEM image of copper particles produced without addition of a salt of a main group metal.
Figure 4B:
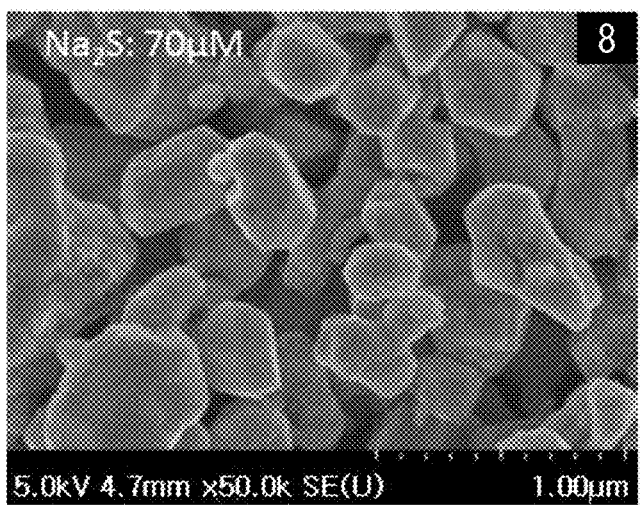
FIGS. 4B and 4C are photographs each showing another example of an SEM image of copper particles produced through the production method according to the embodiment of the present invention.
Figure 4C:
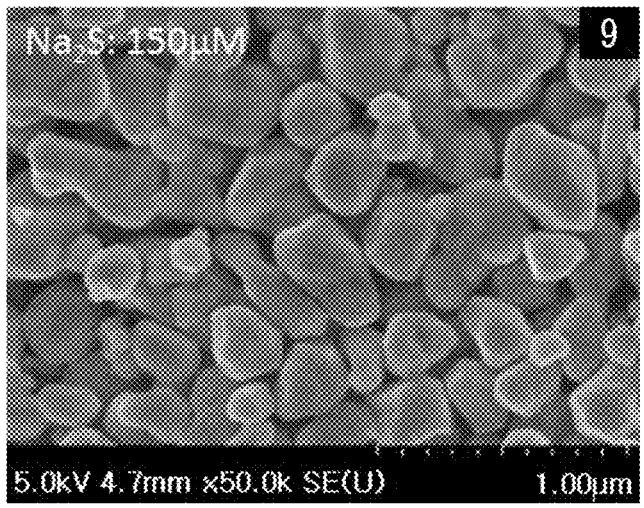

The copper particles shown in FIGS. 4A-4C are produced using copper nitrate ($Cu(NO_3)_2$) as the copper compound, sodium sulfide pentahydrate ($Na_2S.5H_2O$) as the salt of the main group metal, and 1,3-propanediol as the polyhydric alcohol.

Figure 5A:
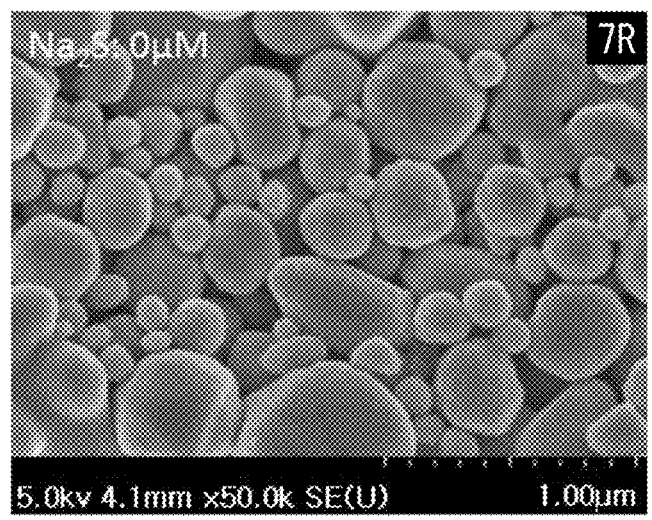
FIG. 5A is a photograph showing another example of an SEM image of copper particles produced without addition of a salt of a main group metal.
Figure 5B:
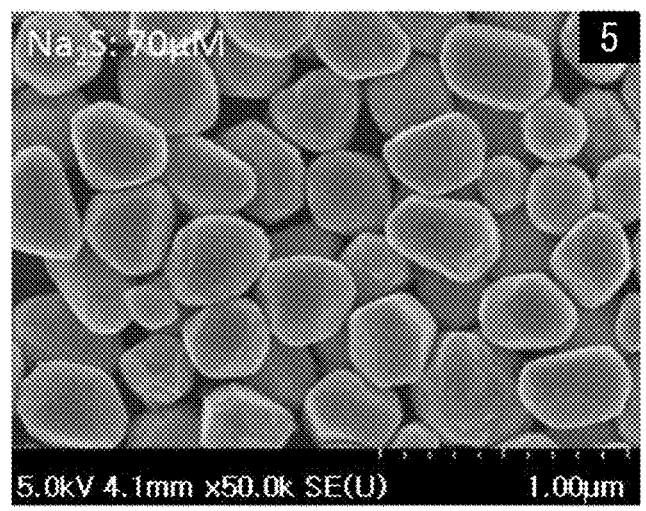
FIGS. 5B and 5C are photographs each showing another example of an SEM image of copper particles produced through the production method according to the embodiment of the present invention.
Figure 5C:
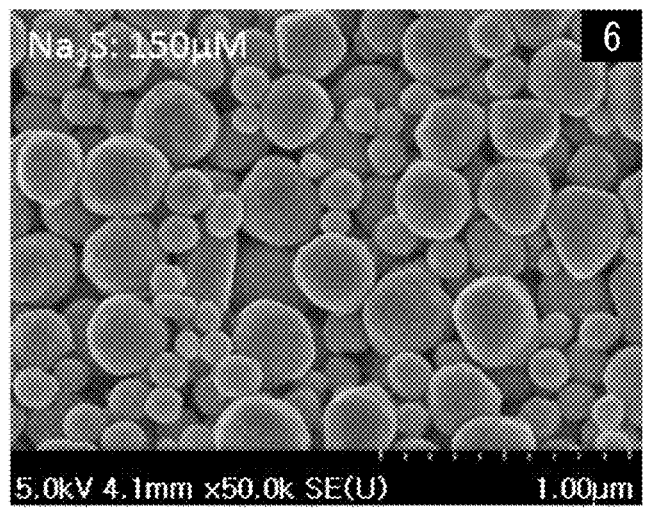

The copper particles shown in FIGS. 5A-5C are produced using copper hydroxide ($Cu(OH)_2$) as the copper compound, sodium sulfide pentahydrate ($Na_2S.5H_2O$) as the salt of the main group metal, and ethylene glycol as the polyhydric alcohol.

<5-4. Type of Copper Compound and Shape of Copper Particles>

The shape of the copper particles tends to vary depending on the type of the copper compound.

As shown in FIGS. 3A-3D, for example, the copper particles produced using copper hydroxide ($Cu(OH)_2$) as the copper compound tend to be in the shape of joining spheres. Furthermore, the shape of the copper particles tends to change from joining spheres to spheres with an increase in the molar concentration of the salt of the main group metal relative to the volume of the mixture. The shape of the copper particles tends to change from spheres back to joining spheres with a further increase in the molar concentration of the salt of the main group metal relative to the volume of the mixture.

As shown in FIGS. 4A-4C, for example, the copper particles produced using copper nitrate ($Cu(NO_3)_2$) as the copper compound tend to be in the shape of convex polyhedra. Furthermore, the shape of the copper particles tends to change from convex polyhedra to convex polyhedra having curved vertices and edges with an increase in the molar concentration of the salt of the main group metal relative to the volume of the mixture.

<5-5. Type of Polyhydric Alcohol and Shape of Copper Particles>

The shape of the copper particles tends to vary depending on the type of the polyhydric alcohol.

As already described with reference to FIGS. 3A-3D, the copper particles produced using 1,3-propanediol as the polyhydric alcohol and copper hydroxide ($Cu(OH)_2$) as the copper compound tend to be in the shape of joining spheres. In contrast, as shown in FIGS. 5A-5C, the copper particles produced using ethylene glycol as the polyhydric alcohol and copper hydroxide (Cu(OH)$_2$) as the copper compound for example tend to be in the shape of convex polyhedra having curved vertices and edges. Furthermore, the shape of the copper particles tends to change from convex polyhedra having curved vertices and edges to spheres with an increase in the molar concentration of the salt of the main group metal relative to the volume of the mixture.

<6. Copper Particle Production Method>

The following descries an example of the method for producing the copper particles. The copper particle production method includes a preparation step and a heating step. The copper particle production method may include a washing step as necessary.

<6-1. Preparation Step>

In the preparation step, a copper compound, a salt of a main group metal, and a polyhydric alcohol are prepared. In the preparation step, the copper compound, the salt of the main group metal, and the polyhydric alcohol described above may be used.

<6-2. Heating Step>

In the heating step, a mixture of the copper compound, the salt of the main group metal, and the polyhydric alcohol is heated. More specifically, the copper compound and the polyhydric alcohol are first mixed at room temperature (for example, 25° C.). The salt of the main group metal is added to the mixture at room temperature. The salt of the main group metal itself may be added. Alternatively, the salt of the main group metal dissolved in a solvent may be added. Next, the mixture is preliminarily stirred for a few minutes (for example, 2 minutes) at room temperature. Thereafter, the mixture is caused to react at a specific reaction temperature for a specific period of time. The reaction may be carried out under stirring. Through the above, the copper particles deposit.

No particular limitations are placed on the reaction temperature in the heating step. The reaction temperature is for example at least 100° C. As a result of the reaction temperature being at least 100° C., the time necessary for the reaction (production of the copper particles) tends to decrease. In terms of readily controlling the particle size or the shape of the resulting copper particles, the reaction temperature is preferably at least 150° C. and no greater than 200° C., and more preferably at least 190° C. and no greater than 200° C.

The maximum particle size of the copper particles can be decreased by increasing the heating temperature (reaction temperature) of the mixture. The maximum particle size of the copper particles can be increased by decreasing the heating temperature (reaction temperature) of the mixture.

Figure 6:
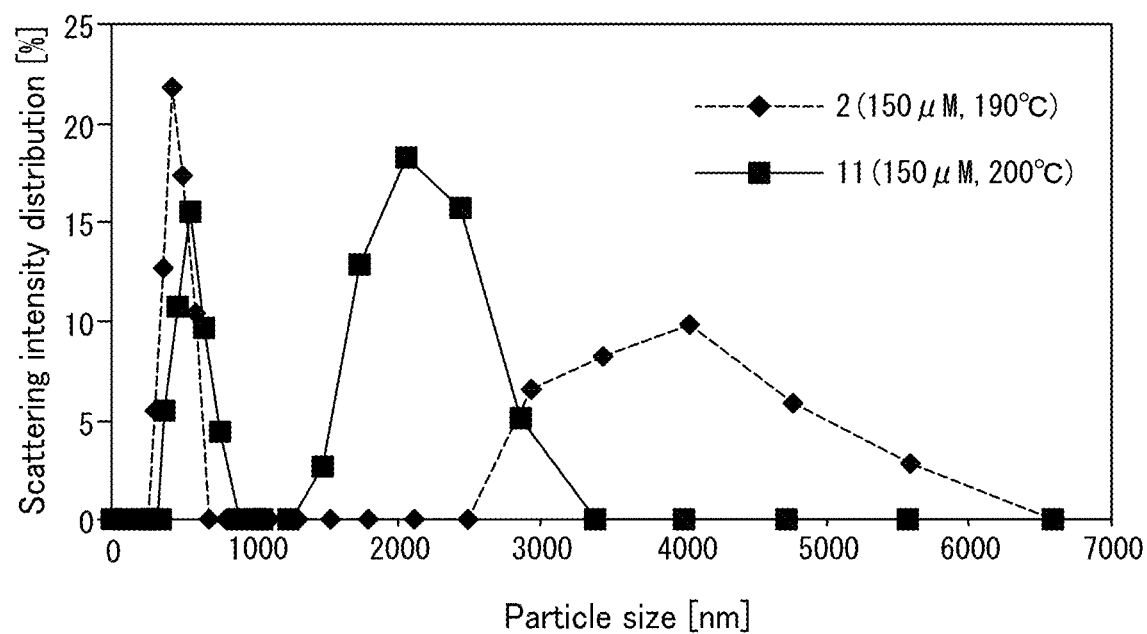
FIG. 6 is a diagram illustrating other examples of particle size distributions of copper particles produced through the production method according to the embodiment of the present invention.
Figure 7A:
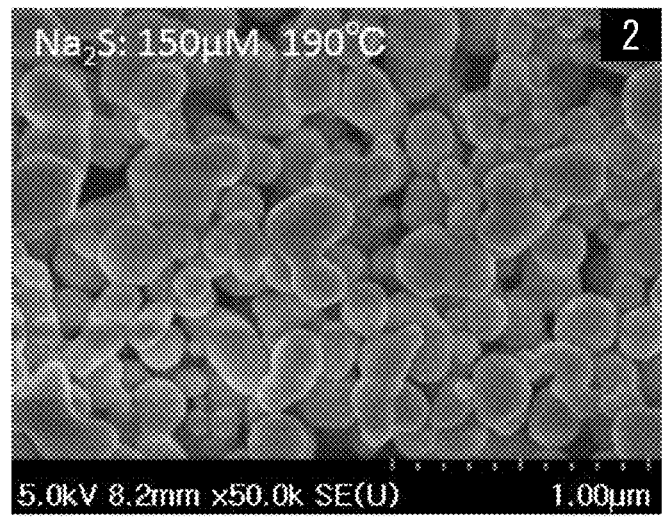
FIGS. 7A and 7B are photographs each showing another example of an SEM image of copper particles produced through the production method according to the embodiment of the present invention.
Figure 7B:
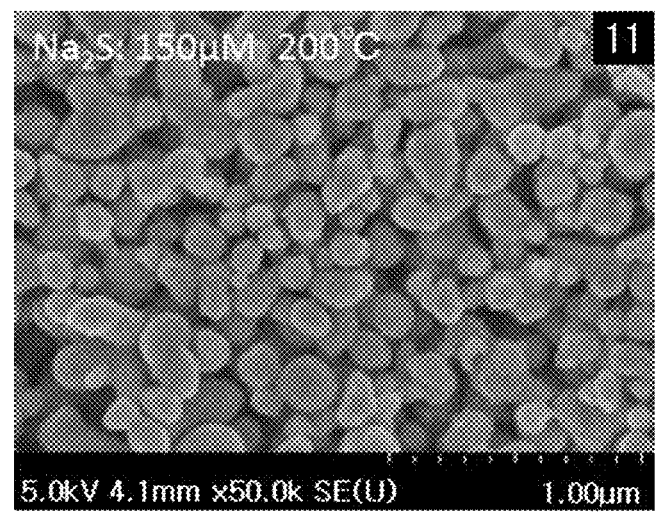

The following describes a relationship between the reaction temperature and the maximum particle size of the copper particles with reference to FIGS. 6 and 7A-7B.

FIG. 6 illustrates particle size distributions of the copper particles. In FIG. 6, the horizontal axis represents particle size [nm] of the copper particles, and the vertical axis represents scattering intensity distribution [%]. Rhombuses on the plot and squares on the plot in FIG. 6 respectively show a particle size distribution of the copper particles obtained at a reaction temperature of 190° C. and a particle size distribution of the copper particles obtained at a reaction temperature of 200° C.

As illustrated in FIG. 6, the maximum particle size of the copper particles tends to decrease with an increase in the reaction temperature from 190° C. to 200° C. Conversely, the maximum particle size of the copper particles tends to increase with a decrease in the reaction temperature from 200° C. to 190° C.

FIGS. 7A and 7B respectively show an SEM image of the copper particles obtained at a reaction temperature of 190° C. and an SEM image of the copper particles obtained at a reaction temperature of 200° C. Each tick in FIGS. 7A-7B is spaced 1.00 μm apart. The SEM images are obtained through observation of the copper particles at a magnification of ×50,000 using an SEM ("Ultra-High-Resolution Cold-Field-Emission Scanning Electron Microscope SU8020", product of Hitachi High-Technologies Corporation).

The tendency of the maximum particle size of the copper particles decreasing with an increase in the reaction temperature from 190° C. to 200° C. is also seen in FIG. 7A-7B. Conversely, the tendency of the maximum particle size of the copper particles increasing with a decrease in the reaction temperature from 200° C. to 190° C. is also seen.

No particular limitations are placed on the reaction temperature in the heating step. In terms of readily controlling the particle size and the shape of the resulting copper particles, the reaction time is preferably at least 40 minutes and no greater than 5 hours, and more preferably at least 1 hour and no greater than 3 hours. The reaction is for example carried out under atmospheric pressure. An additive may be added to the mixture as necessary.

<6-3. Washing Step>

The deposited copper particles are subjected to the washing step as necessary. More specifically, the deposited copper particles are separated using a centrifuge. The separated copper particles are washed using a liquid. The washed copper particles are dispersed in a liquid and thus purified. As a result, the washed copper particles are obtained.

No limitations are placed on the liquid that is used for washing other than that the liquid enables purification of the copper particles. The liquid that is used for washing is for example a polar liquid, preferably an alcohol, and more preferably an alcohol having 1 to 3 hydroxyl groups and an alkyl group having 1 to 6 carbon atoms. In a situation in which an alcohol is used as the liquid for washing, the liquid having the copper particles dispersed therein may be used as the later-described copper paste.

An alteration can be made to the copper particle production method as necessary to implement the method. Furthermore, non-essential procedures or steps may be omitted.

<7. Copper Paste>

The copper paste includes copper particles. The copper paste is for example obtained by mixing the copper particles obtained through the production method according to the present embodiment with an alcohol. The copper paste can for example be used as a wiring material or a bonding material.

The alcohol that is contained in the copper paste is for example an alcohol having 1 to 3 hydroxyl groups and an alkyl group having 1 to 6 carbon atoms.

Examples of alkyl groups having 1 to 6 carbon atoms in the alcohol include a methyl group, an ethyl group, an n-propyl group, an i-propyl group, an n-butyl group, an i-butyl group, a sec-butyl group, a t-butyl group, an n-pentyl group, an i-pentyl group, a sec-pentyl group, a t-pentyl group, a 2-methylbutyl group, an n-hexyl group, a 1-methylpentyl group, a 2-methylpentyl group, a 3-methylpentyl group, a 4-methylpentyl group, a 1-ethylbutyl group, a 2-ethylbutyl group, a 1,1-dimethylbutyl group, a 2,2-dimethylbutyl group, a 3,3-dimethylbutyl group, and a 1-ethyl-1-methylpropyl group.

Examples of alcohols having 1 to 3 hydroxyl groups and an alkyl group having 1 to 6 carbon atoms include methanol, ethanol, ethylene glycol, n-propanol, i-propanol, triethylene glycol, n-butanol, i-butanol, sec-butanol, t-butanol, n-pentanol, i-pentanol, sec-pentanol, t-pentanol, 2-methylbutanol, n-hexanol, 1-methylpentanol, 2-methylpentanol, 3-methylpentanol, 4-methylpentanol, 1-ethylbutanol, 2-ethylbutanol, 1,1-dimethylbutanol, 2,2-dimethylbutanol, 3,3-dimethylbutanol, and 1-ethyl-1-methylpropanol.

The alcohol may have at least one substituent selected from the group consisting of an alkoxy group having 1 to 6 carbon atoms, an amino group, and a halogen group. Examples of alkoxy groups having 1 to 6 carbon atoms include a methoxy group, an ethoxy group, an n-propoxy group, an i-propoxy group, an n-butoxy group, an i-butoxy group, a sec-butoxy group, a t-butoxy group, a pentyloxy group, and a hexyloxy group. Examples of halogen groups include a fluoro group, a bromo group, a chloro group, and an iodo group.

Examples of alcohols having at least one substituent selected from the group consisting of an alkoxy group having 1 to 6 carbon atoms, an amino group, and a halogen group include methoxymethanol, 2-methoxyethanol, 2-ethoxyethanol, 2-chloroethanol, and ethanolamine.

The copper particles are preferably contained in the copper paste in an amount of at least 4 parts by mass and no greater than 16 parts by mass relative to 1 part by mass of the alcohol, more preferably at least 6 parts by mass and no greater than 12 parts by mass, and particularly preferably at least 8 parts by mass and no greater than 10 parts by mass.

Through the above, the copper particle production method according to the present embodiment has been described. The copper particle production method according to the present embodiment enables easy control of the particle diameter and the shape of the copper particles. The copper particles produced through the copper particle production method according to the present embodiment can have a particle size and a shape that easily improve the copper particle packing characteristics. Furthermore, the copper paste including the copper particles produced through the copper particle production method according to the present embodiment has increased bonding strength as including the copper particles having a particle size and a shape that easily improve the copper particle packing characteristics.

EXAMPLES

The following describes the present invention in more detail using examples. Note that the present invention is not limited to the scope of the examples.

<1. Copper Particle Production>

Copper particles 1 were produced as described below. Copper hydroxide ($Cu(OH)_2$) in an amount of 1.5 g, polyvinylpyrrolidone (K value 90) in an amount of 1.5 g, and 1,3-propanediol in an amount of 125 g were mixed at room temperature (25° C.). To the mixture, 6.8 mL of a solution of sodium sulfide pentahydrate ($Na_2S \cdot 5H_2O$) in 1,3-propanediol (molar concentration 1,250 µM) was added. The molar concentration of the sodium sulfide pentahydrate was 70 µM relative to the volume of the mixture (more specifically, the mixture of copper hydroxide, polyvinylpyrrolidone, 1,3-propanediol, and sodium sulfide pentahydrate). All of the reagents that were used were products of Wako Pure Chemical Industries, Ltd. Next, the mixture was stirred at room temperature for 2 minutes. Thereafter, the mixture was caused to react at a reaction temperature of 190° C. for 2 hours under stirring. Through the above, copper particles were caused to deposit. The deposited copper particles were separated for 10 minutes using a centrifuge at a rotational speed of 4,000 rpm. The separated copper particles were washed using ethanol. The washed copper particles were dispersed in ethanol and thus purified. As a result, the copper particles 1 were obtained.

Copper particles 2, 3, 4R, 5, 6, 7R, 8, 9, 10R, 11 to 15, and 16R to 19R were produced according to the same method as the production of the copper particles 1 in all aspects other than the following changes. The copper compound was changed from copper hydroxide ($Cu(OH)_2$), which was employed in the production of the copper particles 1, to each of the copper compounds shown in Table 1. The polyhydric alcohol was changed from 1,3-propanediol, which was employed in the production of the copper particles 1, to each of the polyhydric alcohols shown in Table 1. The salt of the main group metal was changed from sodium sulfide pentahydrate, which was employed in the production of the copper particles 1, to each of the salts of the main group metal shown in Table 1. The molar concentration of the salt of the main group metal relative to the volume of the mixture was changed from 70 µM, which was employed in the production of the copper particles 1, to each of the molar concentrations shown in Table 1. In the examples using sodium sulfide pentahydrate as the salt of the main group metal, the molar concentration of the sodium sulfide pentahydrate in the mixture was adjusted to each of the values shown in Table 1 by changing the amount of the solution of sodium sulfide pentahydrate in 1,3-propanediol (from 6.8 mL). In the production of the copper particles 4R, 7R, and 10R, no salt of a main group metal was added. In the production of the copper particles 16R to 19R, a salt that was not a salt of a main group metal (a non-main group metal salt, specifically ammonium formate) was added instead of the salt of the main group metal. The temperature for the reaction of the mixture was changed from 190° C., which was employed in the production of the copper particles 1, to each of the temperatures shown in Table 1.

Table 1 shows the materials, the molar concentrations, and the temperatures for the reactions of the respective mixtures that were employed in the production of the copper particles. In Table 1, $Cu(OH)_2$ indicates copper hydroxide, $Cu(NO_3)_2$ indicates copper nitrate, PVP indicates polyvinylpyrrolidone, EG indicates ethylene glycol, $Na_2S \cdot 5H_2O$ indicates sodium sulfide pentahydrate, NaOH indicates sodium hydroxide, and $Na_2CO_3$ indicates sodium carbonate. The molar concentrations of the salts of the main group metal shown in Table 1 are molar concentrations of the salts of the main group metal relative to the volumes of the respective mixtures.

TABLE 1

| | | | Main group metal salt | | Non-main group metal salt | | | |
|---|---|---|---|---|---|---|---|---|
| Copper particles | Copper compound Type | Polyhydric alcohol Type | Type | Molar concentration [µM] | Type | Molar concentration [µM] | Dispersant Type | Reaction temperature [° C.] |
| 1 | $Cu(OH)_2$ | 1,3-propanediol | $Na_2S \cdot 5H_2O$ | 70 | None | 0 | PVP | 190 |
| 2 | $Cu(OH)_2$ | 1,3-propanediol | $Na_2S \cdot 5H_2O$ | 150 | None | 0 | PVP | 190 |

TABLE 1-continued

| Copper particles | Copper compound Type | Polyhydric alcohol Type | Main group metal salt Type | Main group metal salt Molar concentration [μM] | Non-main group metal salt Type | Non-main group metal salt Molar concentration [μM] | Dispersant Type | Reaction temperature [° C.] |
|---|---|---|---|---|---|---|---|---|
| 3 | Cu(OH)$_2$ | 1,3-propanediol | Na$_2$S•5H$_2$O | 300 | None | 0 | PVP | 190 |
| 4R | Cu(OH)$_2$ | 1,3-propanediol | None | 0 | None | 0 | PVP | 190 |
| 5 | Cu(OH)$_2$ | EG | Na$_2$S•5H$_2$O | 70 | None | 0 | PVP | 190 |
| 6 | Cu(OH)$_2$ | EG | Na$_2$S•5H$_2$O | 150 | None | 0 | PVP | 190 |
| 7R | Cu(OH)$_2$ | EG | None | 0 | None | 0 | PVP | 190 |
| 8 | Cu(NO$_3$)$_2$ | 1,3-propanediol | Na$_2$S•5H$_2$O | 70 | None | 0 | PVP | 190 |
| 9 | Cu(NO$_3$)$_2$ | 1,3-propanediol | Na$_2$S•5H$_2$O | 150 | None | 0 | PVP | 190 |
| 10R | Cu(NO$_3$)$_2$ | 1,3-propanediol | None | 0 | None | 0 | PVP | 190 |
| 11 | Cu(OH)$_2$ | 1,3-propanediol | Na$_2$S•5H$_2$O | 150 | None | 0 | PVP | 200 |
| 12 | Cu(NO$_3$)$_2$ | EG | NaOH | 150 | None | 0 | PVP | 200 |
| 13 | Cu(NO$_3$)$_2$ | EG | NaOH | 300 | None | 0 | PVP | 200 |
| 14 | Cu(NO$_3$)$_2$ | EG | Na$_2$CO$_3$ | 150 | None | 0 | PVP | 200 |
| 15 | Cu(NO$_3$)$_2$ | EG | Na$_2$CO$_3$ | 300 | None | 0 | PVP | 200 |
| 16R | Cu(OH)$_2$ | 1,3-propanediol | None | 0 | Ammonium formate | 150 | PVP | 190 |
| 17R | Cu(OH)$_2$ | 1,3-propanediol | None | 0 | Ammonium formate | 300 | PVP | 190 |
| 18R | Cu(NO$_3$)$_2$ | EG | None | 0 | Ammonium formate | 150 | PVP | 190 |
| 19R | Cu(NO$_3$)$_2$ | EG | None | 0 | Ammonium formate | 300 | PVP | 190 |

<2. Measurement of Particle Size Distribution>

The particle size distribution of the copper particles obtained was measured by dynamic light scattering as described below. A measurement sample (the copper particles) in an amount of 0.1 g was dispersed in 50 mL of a dispersion solvent (ethanol). A resulting dispersion of the measurement sample in an amount of 2.5 mL was loaded into a cell made of quartz glass. The cell was set in a measuring device. The "particle size measurement system ELS-Z2", product of Otsuka Electronics Co., Ltd. was used as the measuring device. Measurement conditions were set as described below.

(Conditions for Measurement of Particle Size Distribution)
Wet Measurement
Light source: semiconductor laser
Refractive index of dispersion solvent: 1.36 (ethanol)
Measurement range: 0.6 nm to 9,000 nm
Measurement time: 120 seconds The particle size distributions of the copper particles 1, 2, 3, and 4R are shown in FIG. 1. In FIG. 1, the particle size distributions of the copper particles 1, 2, 3, and 4R are respectively represented by the squares on the plot (molar concentration of the salt of the main group metal: 70 μM), the triangles on the plot (molar concentration of the salt of the main group metal: 150 μM), the crosses on the plot (molar concentration of the salt of the main group metal: 300 μM), and the rhombuses on the plot (molar concentration of the salt of the main group metal: 0 μM).

The particle size distributions of the copper particles 5, 6, and 7R are shown in FIG. 2. In FIG. 2, the particle size distributions of the copper particles 5, 6, and 7R are respectively represented by the squares on the plot (molar concentration of the salt of the main group metal: 70 μM), the triangles on the plot (molar concentration of the salt of the main group metal: 150 μM), and the rhombuses on the plot (molar concentration of the salt of the main group metal: 0 μM).

The particle size distributions of the copper particles 2 and 11 are shown in FIG. 6. In FIG. 6, the particle size distributions of the copper particles 2 and 11 are respectively represented by the rhombuses on the plot (molar concentration of the salt of the main group metal: 150 μM, reaction temperature: 190° C.) and the squares on the plot (molar concentration of the salt of the main group metal: 150 μM, reaction temperature: 200° C.).

Figure 11:
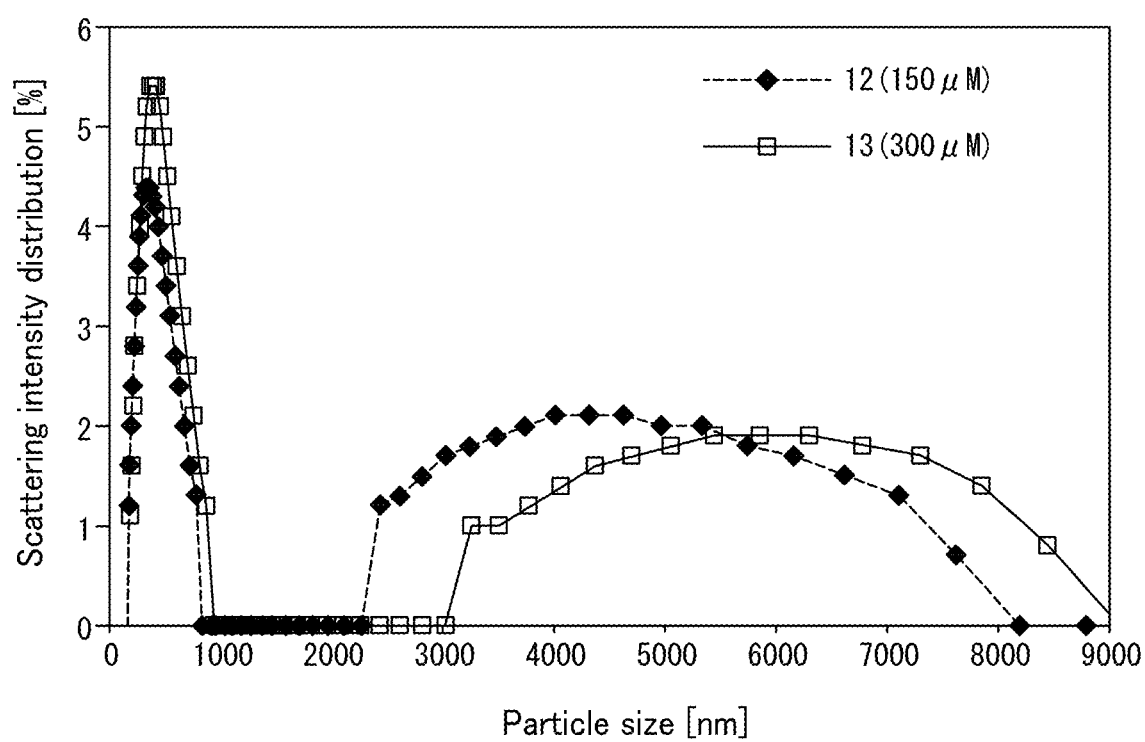
FIG. 11 is a diagram illustrating other examples of particle size distributions of copper particles produced through the production method according to the embodiment of the present invention.

The particle size distributions of the copper particles 12 and 13 are shown in FIG. 11. In FIG. 11, the particle size distributions of the copper particles 12 and 13 are respectively represented by the rhombuses on the plot (molar concentration of the salt of the main group metal: 150 μM) and the squares on the plot (molar concentration of the salt of the main group metal: 300 μM).

Figure 13:
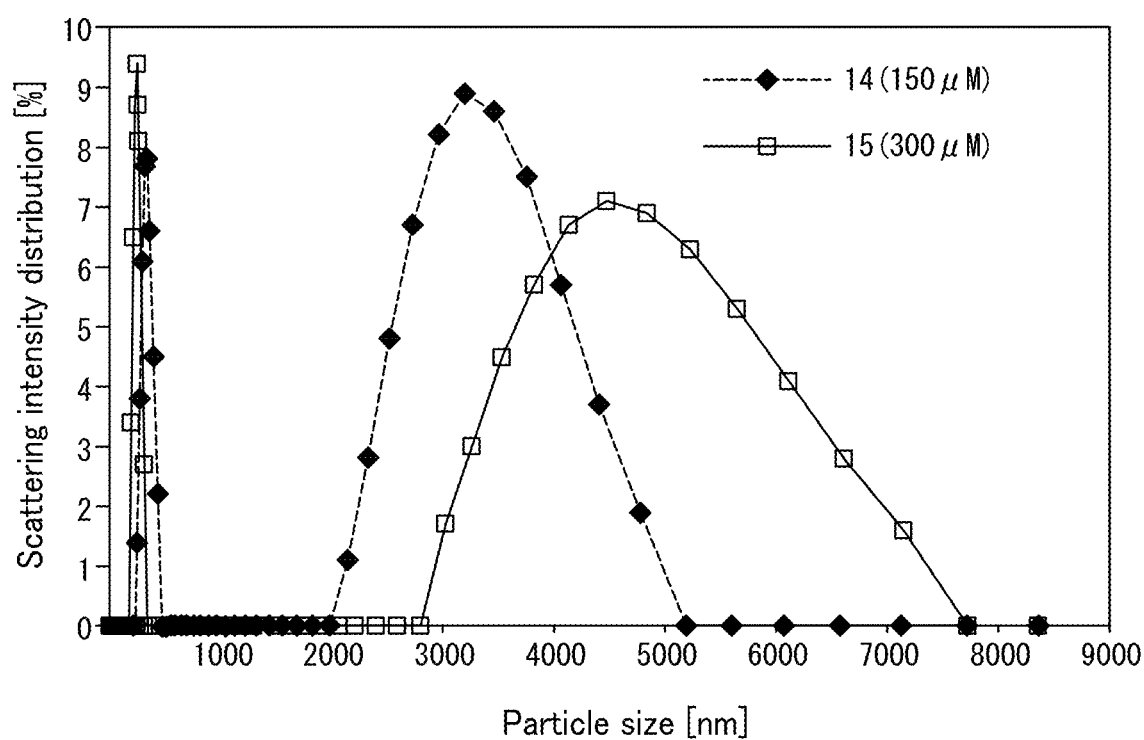
FIG. 13 is a diagram illustrating other examples of particle size distributions of copper particles produced through the production method according to the embodiment of the present invention.

The particle size distributions of the copper particles 14 and 15 are shown in FIG. 13. In FIG. 13, the particle size distributions of the copper particles 14 and 15 are respectively represented by the rhombuses on the plot (molar concentration of the salt of the main group metal: 150 μM) and the squares on the plot (molar concentration of the salt of the main group metal: 300 μM).

Figure 15:
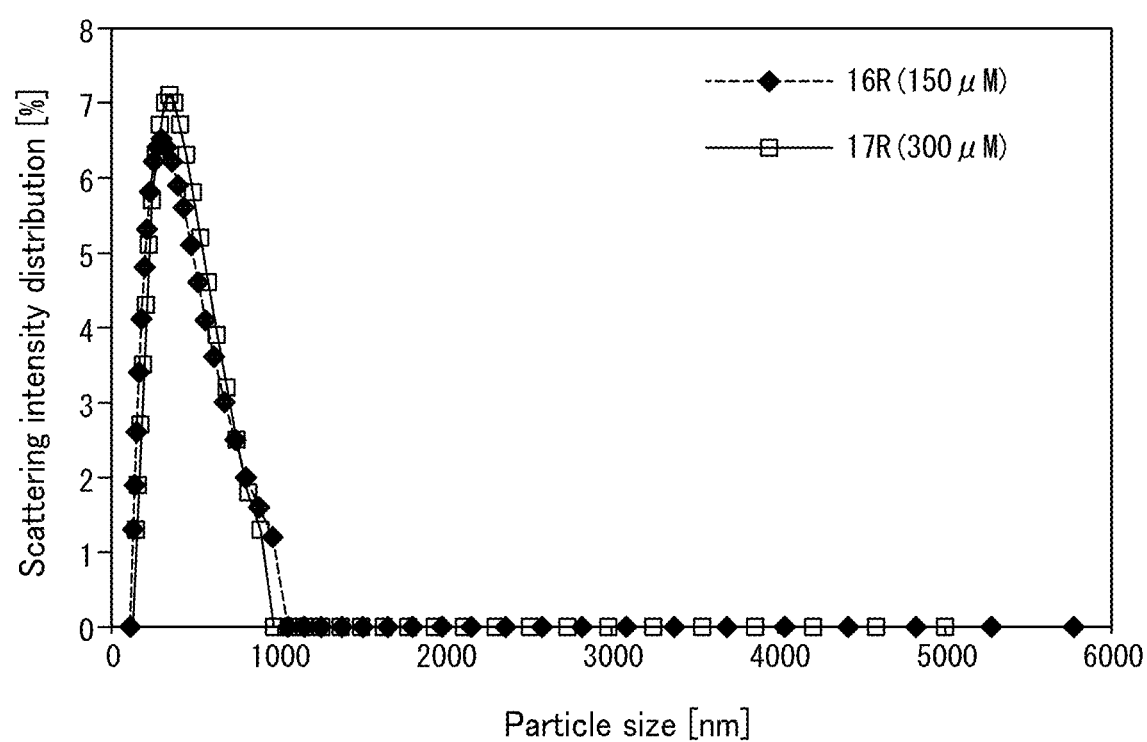
FIG. 15 is a diagram illustrating examples of particle size distributions of copper particles produced without addition of a salt of a main group metal.

The particle size distributions of the copper particles 16R and 17R are shown in FIG. 15. In FIG. 15, the particle size distributions of the copper particles 16R and 17R are respectively represented by the rhombuses on the plot (molar concentration of non-main group metal salt: 150 μM) and the squares on the plot (molar concentration of the non-main group metal salt: 300 μM).

Figure 17:
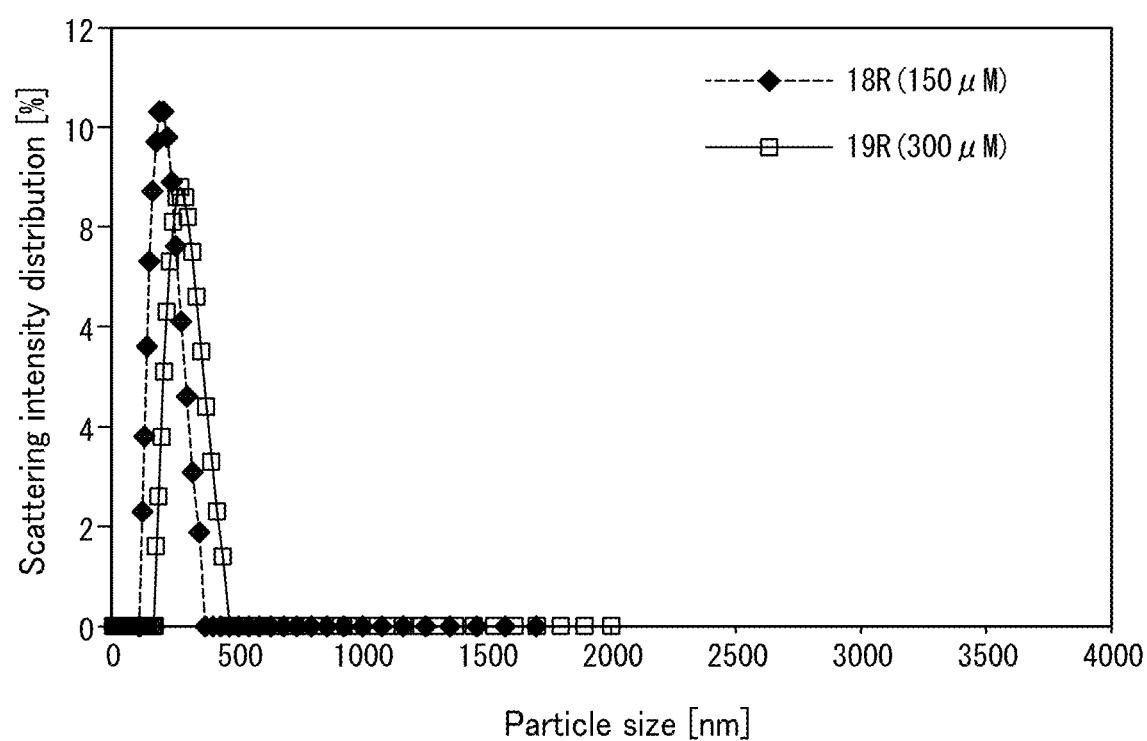
FIG. 17 is a diagram illustrating other examples of particle size distributions of copper particles produced without addition of a salt of a main group metal.

The particle size distributions of the copper particles 18R and 19R are shown in FIG. 17. In FIG. 17, the particle size distributions of the copper particles 18R and 19R are respectively represented by the rhombuses on the plot (molar concentration of the non-main group metal salt: 150 μM) and the squares on the plot (molar concentration of the non-main group metal salt: 300 μM).

Values of $P1_d$, $P1_m$, $R1$, $L1$, $P2a_d$, $P2a_{max}$, $P2b_d$, $P2b_{max}$, $R2b$, and $L2b$ were obtained from the thus measured particle size distribution of the copper particles. Furthermore, the difference ($R1-L1$) between the particle size $R1$ at the right end of the peak $P1$ and the particle size $L1$ at the left end of the peak $P1$ was calculated. The difference ($R2b-L2b$) between the particle size $R2b$ at the right end of the peak $P2b$ and the particle size $L2b$ at the left end of the peak $P2b$ was calculated. The ratio ($P2b_{max}/P2a_{max}$) of the maximum value $P2b_{max}$ of the scattering intensity distribution associated with the peak P2b to the maximum value $P2a_{max}$ of the scattering intensity distribution associated with the peak P2a was calculated. In Table 2, each of the symbols "-" indicates that the particle size distribution did not show the peak.

<3. SEM Observation>

The copper particles were observed as described below using an SEM. "Ultra-High-Resolution Field Emission Scanning Electron Microscope SU8020", product of Hitachi High-Technologies Corporation was used as the SEM. The

TABLE 2

| | Peak 1 | | | | | Peak P2a | | Peak P2b | | | | | |
|---|---|---|---|---|---|---|---|---|---|---|---|---|---|
| Copper particles | $P1_d$ [nm] | $P1_{max}$ [%] | R1 [nm] | L1 [nm] | R1 − L1 [nm] | $P2a_d$ [nm] | $P2a_{max}$ [%] | $P2b_d$ [nm] | $P2b_{max}$ [%] | R2b [nm] | L2b [nm] | R2b − L2b [nm] | $P2b_{max}/P2a_{max}$ |
| 1 | 3715 | 14.0 | 8264 | 2114 | 6150 | — | — | — | — | — | — | — | — |
| 2 | — | — | — | — | — | 417 | 22.0 | 4046 | 10.0 | 6584 | 2487 | 4097 | 0.5 |
| 3 | — | — | — | — | — | 236 | 24.0 | 2272 | 11.0 | 3312 | 1290 | 2022 | 0.5 |
| 4R | — | — | — | — | — | 345 | 9.0 | 1780 | 19.0 | 3100 | 1050 | 2050 | 2.1 |
| 5 | 396 | 3.8 | 2363 | 100 | 2263 | — | — | — | — | — | — | — | — |
| 6 | — | — | — | — | — | 393 | 12.0 | 3769 | 6.0 | 5920 | 2140 | 3780 | 0.5 |
| 7R | — | — | — | — | — | 302 | 13.0 | 3825 | 3.0 | 6310 | 2220 | 4090 | 0.2 |
| 11 | — | — | — | — | — | 550 | 15 | 2064 | 18 | 3400 | 1250 | 2150 | 1.2 |
| 12 | — | — | — | — | — | 354 | 4.4 | 4626 | 2.1 | 8120 | 2430 | 5690 | 0.5 |
| 13 | — | — | — | — | — | 419 | 5.4 | 6299 | 1.9 | 9080 | 3020 | 6060 | 0.4 |
| 14 | — | — | — | — | — | 339 | 7.8 | 3197 | 8.9 | 5170 | 3028 | 2142 | 1.1 |
| 15 | — | — | — | — | — | 247 | 9.4 | 4468 | 7.1 | 7730 | 2790 | 4940 | 0.8 |
| 16R | 303 | 6.5 | 1065 | 125 | 940 | — | — | — | — | — | — | — | — |
| 17R | 378 | 7.0 | 975 | 135 | 840 | — | — | — | — | — | — | — | — |
| 18R | 192 | 10.3 | 378 | 118 | 260 | — | — | — | — | — | — | — | — |
| 19R | 276 | 8.8 | 470 | 170 | 300 | — | — | — | — | — | — | — | — |

Table 2, FIGS. 1, 2, 6, 11, and 13 have revealed that the copper particles having different particle size distribution can be obtained by changing the molar concentration of the salt of the main group metal relative to the volume of the mixture.

As will be apparent from Table 2 and FIG. 1, the copper particles 1 had the characteristic (I) in their particle size distribution. As will be apparent from Table 2 and FIG. 2, the copper particles 5 had the characteristic (V) in their particle size distribution.

As will be apparent from Table 2, and FIGS. 1, 2, 6, 11, and 13, the copper particles had the characteristic (II) and the characteristic (III) in their particle size distributions as described below. FIG. 1 shows that the copper particles 2 and 3 had the characteristic (II) and the characteristic (III) in their particle size distributions. FIG. 2 shows that the copper particles 6 had the characteristic (II) and the characteristic (III) in their particle size distribution. FIG. 6 shows that the copper particles 2 and 11 had the characteristic (II) and the characteristic (III) in their particle size distributions. FIG. 11 shows that the copper particles 12 and 13 had the characteristic (II) and the characteristic (III) in their particle size distributions. FIG. 13 shows that the copper particles 14 and 15 had the characteristic (II) and the characteristic (III) in their particle size distributions.

As will be apparent from Table 2, and FIGS. 1, 2, 11, and 13, the copper particles had the characteristic (IV) in addition to the characteristic (II) and the characteristic (III) in their particle size distributions as described below. FIG. 1 shows that the copper particles 2 had the characteristic (IV) in their particle size distribution. FIG. 2 shows that the copper particles 6 had the characteristic (IV) in their particle size distribution. FIG. 11 shows that the copper particles 12 and 13 had the characteristic (IV) in their particle size distributions. FIG. 13 shows that the copper particles 14 and 15 had the characteristic (IV) in their particle size distributions.

FIG. 6 has demonstrated that the maximum particle size of the copper particles is decreased or increased by changing the heating temperature of the mixture.

magnification was set to ×50,000. Each tick in FIGS. 3A-5C, 7A-7B, 12A-12B, 14A-14B, 16A-16B, and 18A-18B is spaced 1.00 μm apart.

Figure 12A:
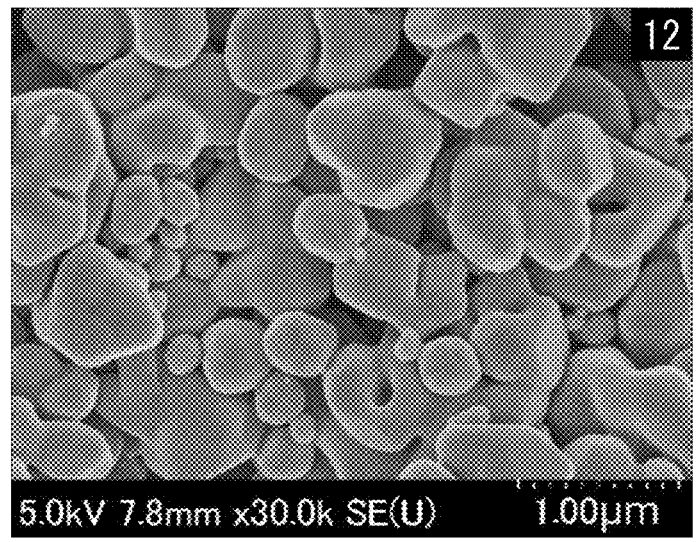
FIGS. 12A and 12B are photographs each showing another example of an SEM image of copper particles produced through the production method according to the embodiment of the present invention.
Figure 12B:
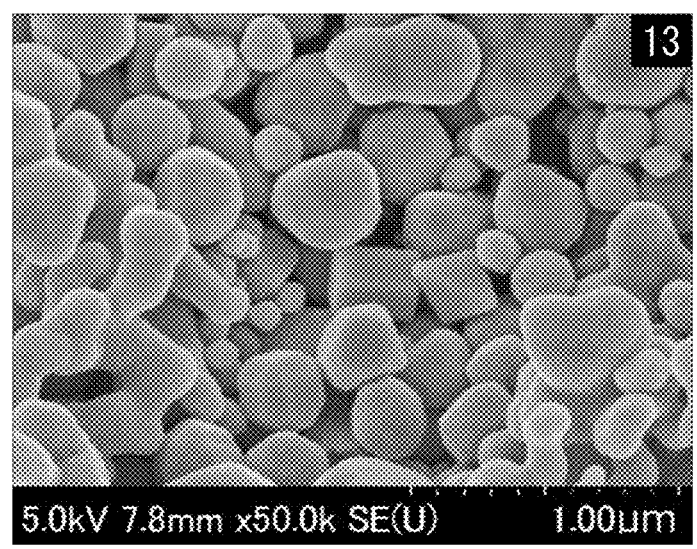
Figure 14A:
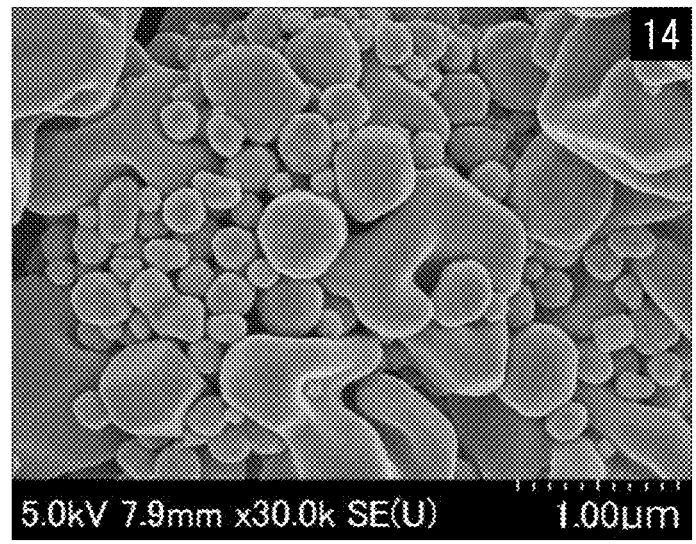
FIGS. 14A and 14B are photographs each showing another example of an SEM image of copper particles produced through the production method according to the embodiment of the present invention.
Figure 14B:
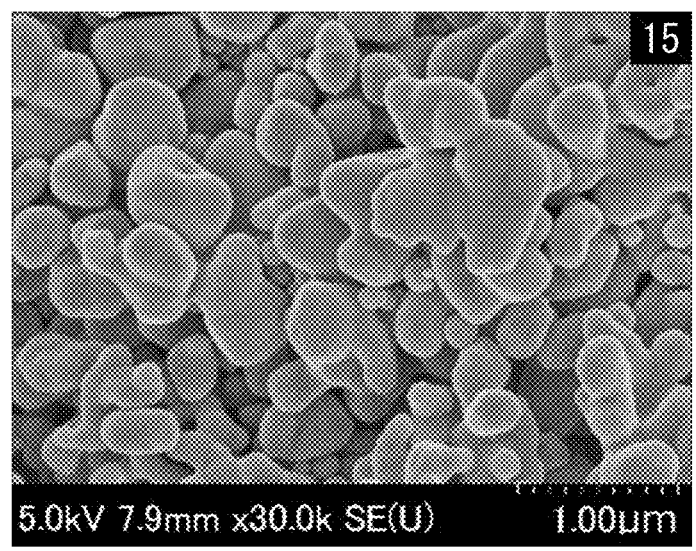
Figure 16A:
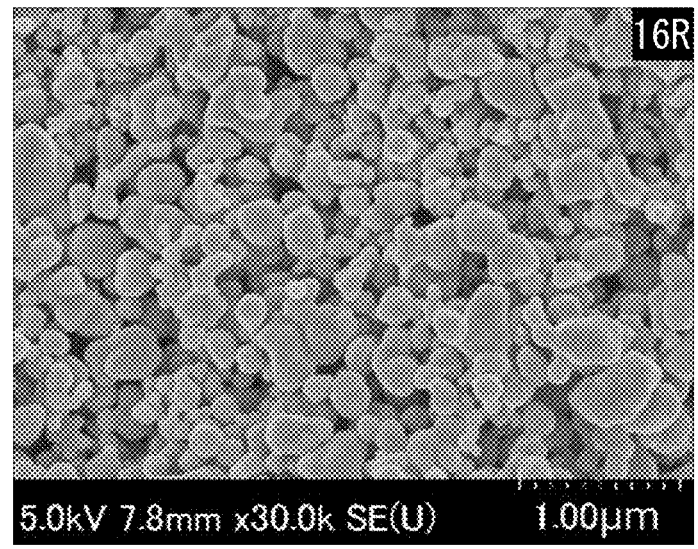
FIGS. 16A and 16B are photographs each showing an example of an SEM image of copper particles produced without addition of a salt of a main group metal.
Figure 16B:
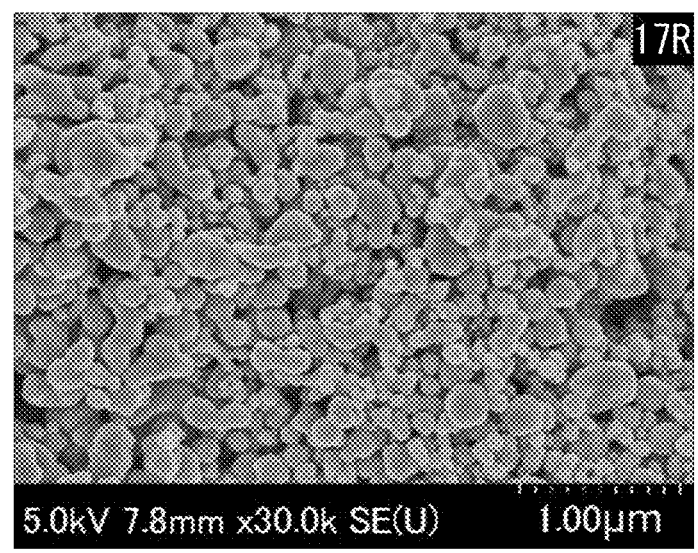
Figure 18A:
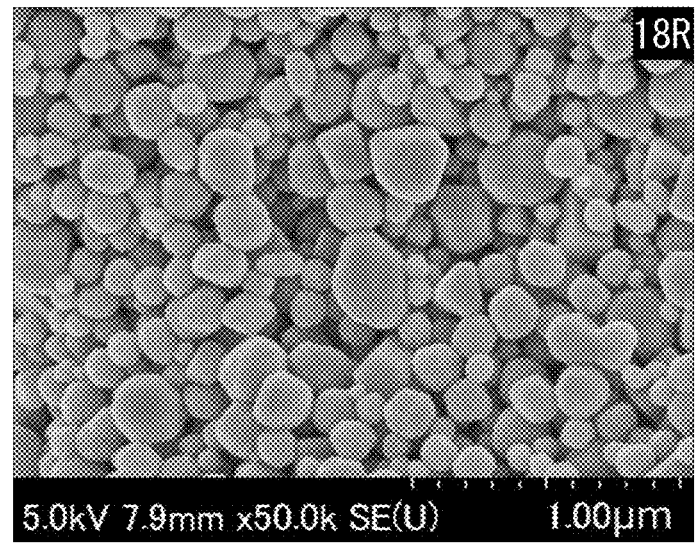
FIGS. 18A and 18B are photographs each showing another example of an SEM image of copper particles produced without addition of a salt of a main group metal.
Figure 18B:
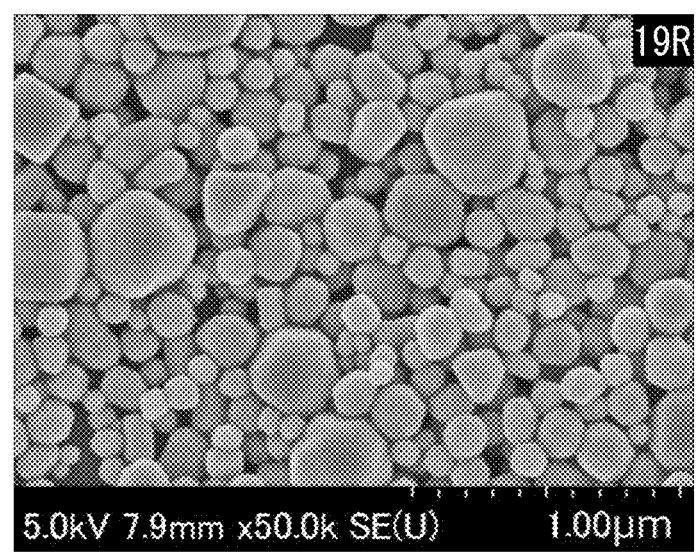

FIGS. 3B, 3C, 3D, and 3A respectively show photographs of SEM images of the copper particles 1, 2, 3, and 4R. FIGS. 4B, 4C, and 4A respectively show photographs of SEM images of the copper particles 8, 9, and 10R. FIGS. 5B, 5C, and 5A respectively show photographs of SEM images of the copper particles 5, 6, and 7R. FIGS. 7A and 7B respectively show photographs of SEM images of the copper particles 2 and 11. FIGS. 12A and 12B respectively show photographs of SEM images of the copper particles 12 and 13. FIGS. 14A and 14B respectively show photographs of SEM images of the copper particles 14 and 15. FIGS. 16A and 16B respectively show photographs of SEM images of the copper particles 16R and 17R. FIGS. 18A and 18B respectively show photographs of SEM images of the copper particles 18R and 19R.

FIGS. 3A-3D and 4A-4C have revealed that the shape of the copper particle varies depending on the type of the copper compound. FIGS. 3A-3D and 5A-5C have revealed that the shape of the copper particle varies depending on the type of the polyhydric alcohol. FIGS. 7A-7B have revealed that the shape of the copper particles varies depending on the reaction temperature. FIGS. 12A-12B, 14A-14B, and 18A-18B have revealed that the use of the salt of the main group metal tends to provide the copper particles in which small-size copper particles and large-size copper particles are mixed in an appropriate ratio with fewer small-size copper particles, compared to the use of the non-main group metal salt. FIGS. 3A-3D and 16A-16B have revealed that the use of the salt of the main group metal tends to provide the copper particles in which small-size copper particles and large-size copper particles are mixed in an appropriate ratio with fewer small-size copper particles, compared to the use of the non-main group metal salt.

<4. Measurement of X-Ray Diffraction Spectrum>

An X-ray diffraction spectrum of the copper particles was measured as described below. A measurement sample (a solution of copper particles in ethanol) was dripped onto a glass substrate. Thus, a thin film of the copper particles was formed on the glass substrate. The thin film of the copper particles was measured using an X-ray diffractometer ("curved imaging plate X-ray diffractometer RINT (registered Japanese trademark)-RAPID II", product of Rigaku Corporation). Measurement conditions were set as described below.

Figure 8:
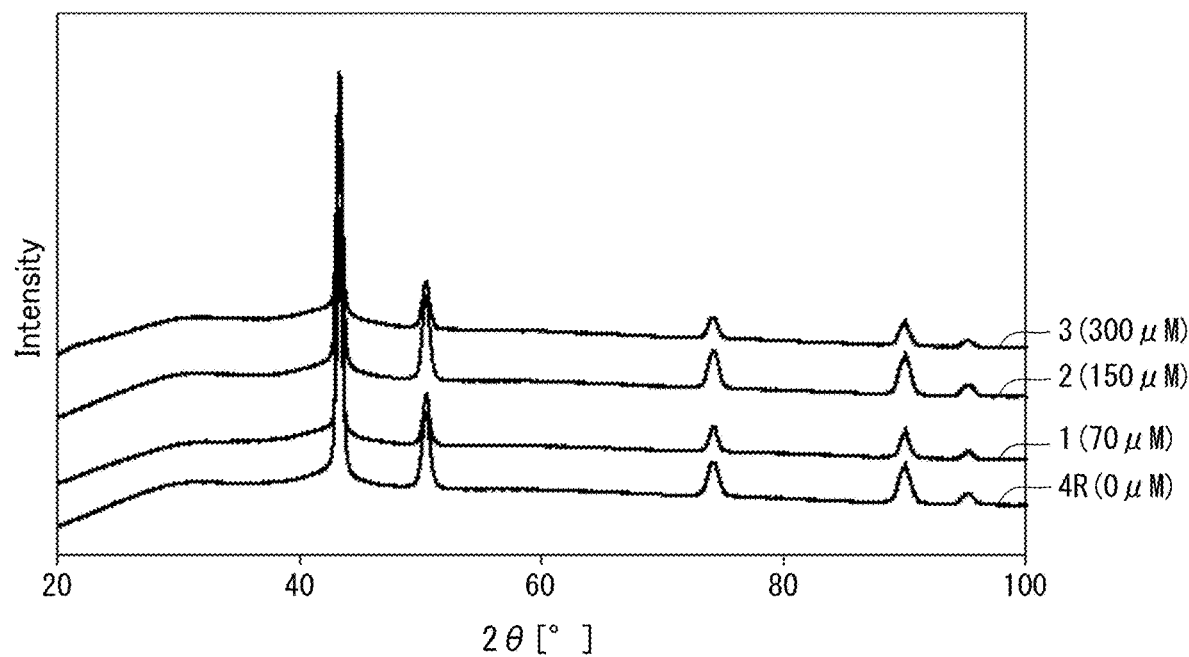
FIG. 8 is a diagram illustrating examples of X-ray diffraction spectra of copper particles produced through the production method according to the embodiment of the present invention.
Figure 9:
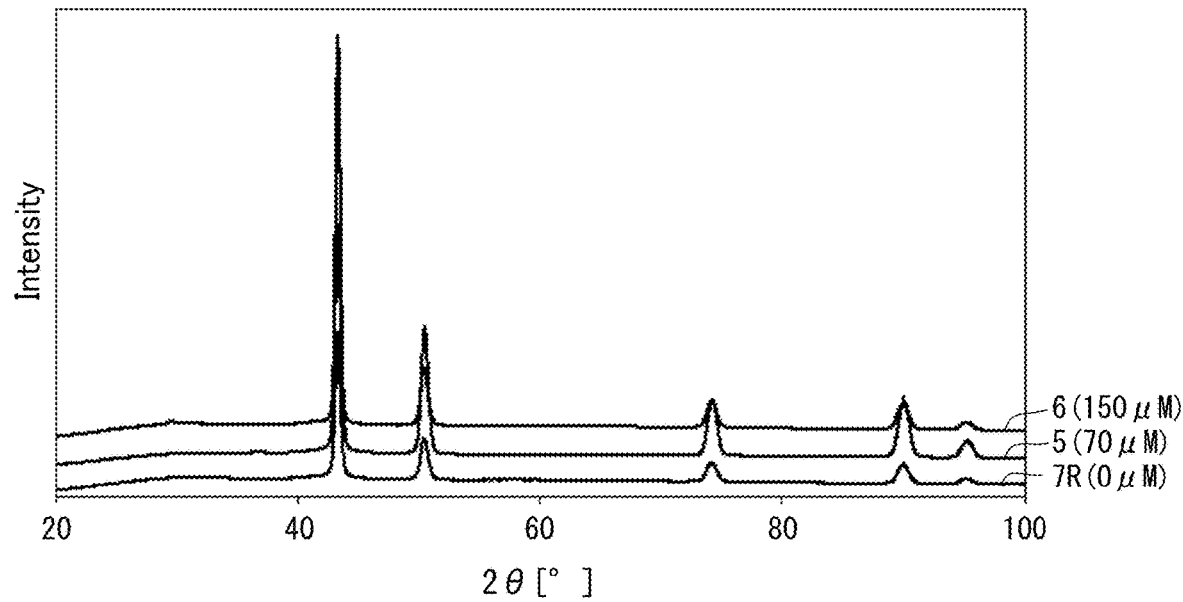
FIG. 9 is a diagram illustrating other examples of X-ray diffraction spectra of copper particles produced through the production method according to the embodiment of the present invention.
Figure 10:
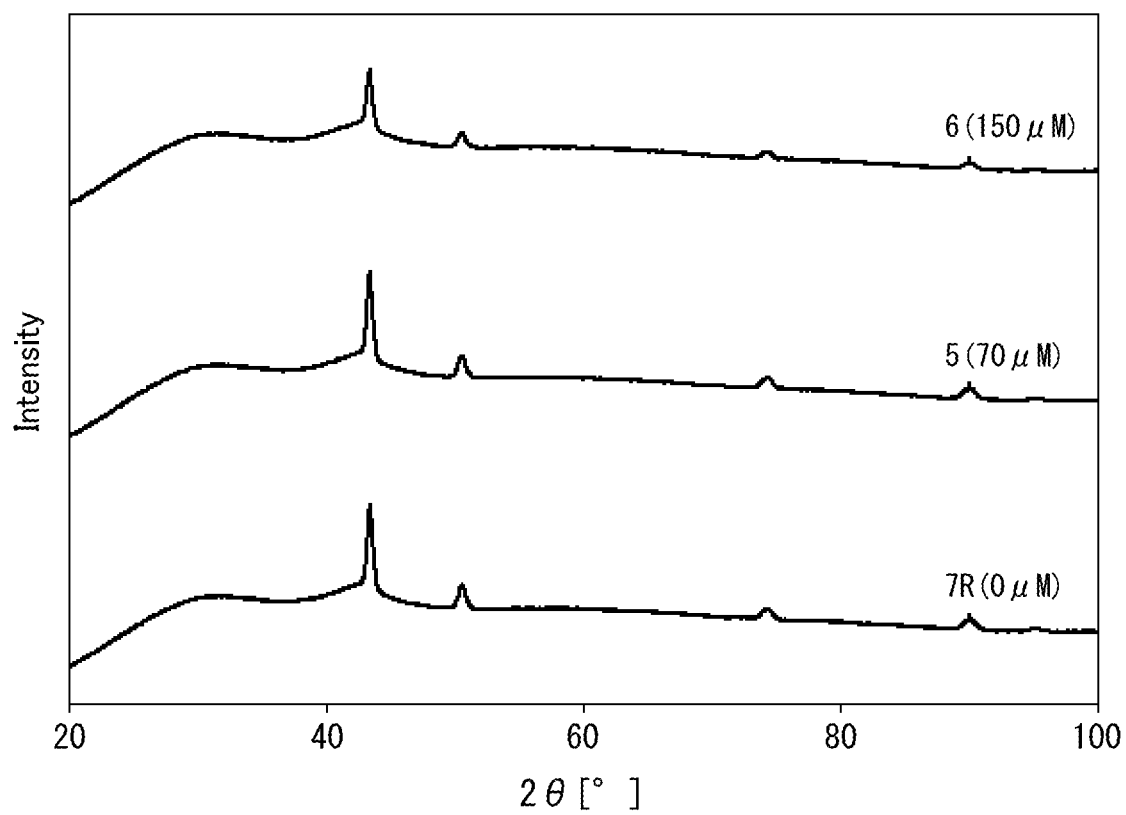
FIG. 10 is a diagram illustrating other examples of X-ray diffraction spectra of copper particles produced through the production method according to the embodiment of the present invention.

(Conditions for Measurement of X-Ray Diffraction Spectrum)
Wavelength of CuKα characteristic X-rays: 1.54 Å.
Tube voltage: 40 kV
Tube current: 30 mA
Measurement range (2θ): 20° to 100°
Scanning rate: 100°/minute FIGS. 8-10 show X-ray diffraction spectra of the copper particles. In FIGS. 8-10, the horizontal axis represents Bragg angle 2θ [°], and the vertical axis represents intensity (arbitrary unit).

The X-ray diffraction spectra of the copper particles 1, 2, 3, and 4R are shown in FIG. 8. In FIG. 8, the X-ray diffraction spectra of the copper particles 1, 2, 3, and 4R respectively correspond to spectra with annotations of 70 μM, 150 μM, 300 μM, and 0 μM.

The X-ray diffraction spectra of the copper particles 8, 9, and 10R are shown in FIG. 9. In FIG. 9, the X-ray diffraction spectra of the copper particles 8, 9, and 10R respectively correspond to spectra with annotations of 70 μM, 150 μM, and 0 μM.

The X-ray diffraction spectra of the copper particles 5, 6, and 7R are shown in FIG. 10. In FIG. 10, the X-ray diffraction spectra of the copper particles 5, 6, and 7R respectively correspond to spectra with annotations of 70 μM, 150 μM, and 0 μM.

FIGS. 8-10 have revealed that the X-ray diffraction spectra of the copper particles 1, 2, 3, 5, 6, 8, and 9 are consistent with an X-ray diffraction spectrum of copper. The result has indicated that even if the copper particles are produced through heating of a mixture of a copper compound, a salt of a main group metal, and a polyhydric alcohol, oxidation of the resulting copper particles is inhibited.

<5. Shear Strength Test>

A paste including copper particles (copper paste) was obtained by mixing 90 parts by mass of the copper particles (copper particles 2, 6, or 4R) with 10 parts by mass of ethylene glycol. A shear strength test was performed on the thus obtained copper paste.

Figure 19:
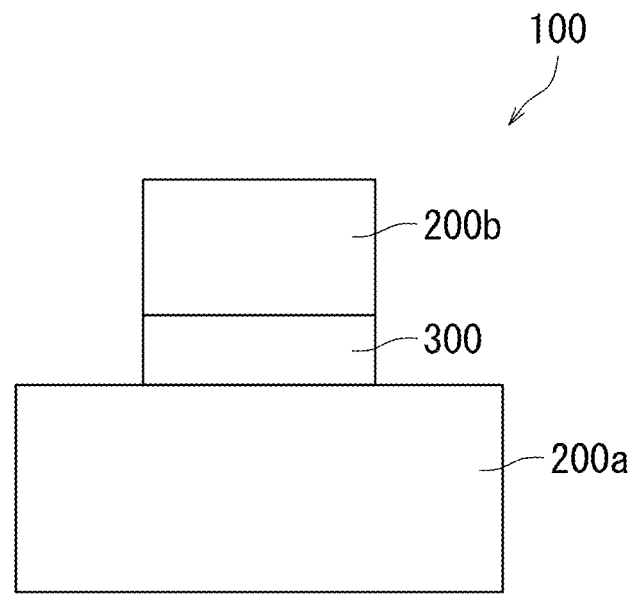
FIG. 19 is a diagram illustrating a bond sample used in a shear strength test.

The following describes a bond sample 100 used in the shear strength test and a method of the shear strength test with reference to FIG. 19. As illustrated in FIG. 19, the bond sample 100 includes a copper substrate 200a, a copper substrate 200b, and a copper paste 300. The copper paste 300 bonds the copper substrate 200a and the copper substrate 200b. More specifically, the copper paste 300 was printed on the copper substrate 200a having a size of 8 mm×8 mm using a 0.1 μm mask. The copper substrate 200b having a size of 4 mm×4 mm was placed on the printed copper paste 300. Next, the copper substrate 200a, the copper paste 300, and the copper substrate 200b were heated at temperatures of 250° C., 300° C., and 350° C. for 30 minutes. The heating was carried out in vacuo with a pressure of 0.4 MPa being applied in a direction from the copper substrate 200b toward the copper substrate 200a. Through the above, the copper paste 300 was calcined (sintered) to bond the copper substrate 200a and the copper substrate 200b. Thus, the bond sample 100 was obtained. Next, shear force was applied to the bonded copper substrate 200a and the copper substrate 200b to measure the shear strength of the copper paste 300. Through the above, the bond sample 100 used in the shear strength test and the method of the shear strength test have been described with reference to FIG. 19.

Figure 20:
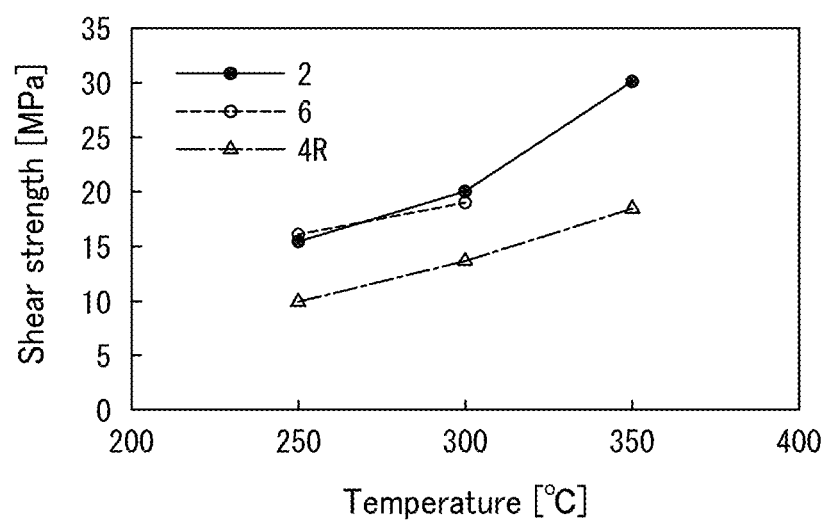
FIG. 20 is a graph showing a relationship between sintering temperature and shear strength with respect to copper pastes each including copper particles produced through the production method according to the embodiment of the present invention.

Table 3 and FIG. 20 show the measured shear strength. In FIG. 20, the horizontal axis represents heating temperature in sintering (unit: ° C.), and the vertical axis represents shear strength (unit: MPa). In FIG. 20, black circles on the plot, white circles on the plot, and triangles on the plot respectively represent the shear strength of the copper paste including the copper particles 2, the shear strength of the copper paste including the copper particles 6, and the shear strength of the copper paste including the copper particles 4R. A greater shear strength indicates that the copper paste has a higher bonding strength.

TABLE 3

| Copper | Shear strength [Mpa] | | |
|---|---|---|---|
| particles | 250° C. | 300° C. | 350° C. |
| 2 | 15.4 | 20.0 | 30.0 |
| 6 | 16.0 | 19.0 | Not measured |
| 4R | 9.9 | 13.6 | 18.5 |

As shown in Table 3 and FIG. 20, the copper paste including the copper particles 2 and the copper paste including the copper particles 6 each had a greater shear strength and higher bonding strength than the copper paste including the copper particles 4R. This is thought to be because the copper particles included in the copper paste prior to sintering had good packing characteristics.

INDUSTRIAL APPLICABILITY

The method for producing copper particles according to the present invention is for example applicable to production of copper particles to be included in a copper paste. The copper particles and the copper paste according to the present invention are for example usable as materials of copper wiring for printing on electronic products.

REFERENCE SIGNS LIST

P1 Peak
P2a Peak
P2b Peak
P2a$_{max}$ Maximum value of scattering intensity distribution associated with peak P2a
P2b$_{max}$ Maximum value of scattering intensity distribution associated with peak P2b
C1 First molar concentration
C2 Second molar concentration
C3 Third molar concentration

The invention claimed is:

1. A method for producing copper particles, the method comprising:
preparing a copper compound, a salt of sodium, and a polyhydric alcohol; and
heating a mixture including the copper compound, the salt of sodium, and the polyhydric alcohol to produce copper particles through reduction of the copper compound by the polyhydric alcohol, wherein
the polyhydric alcohol is ethylene glycol or propanediol,
the salt of sodium has a molar concentration of at least 150 μM and no greater than 300 μM relative to a volume of the mixture, the copper particles have a specific characteristic in their particle size distribution as measured by dynamic light scattering, and the specific characteristic is that the particle size distribution has two peaks, one of the two peaks is in a range of particle sizes of less than 1,000 nm and the other of the two peaks is in a range of particle sizes of greater than or equal to 1,000 nm, and a ratio of a maximum value of a scattering intensity distribution associated with the other peak in the range of particle sizes of greater than or equal to 1,000 nm to a maximum value of the scattering intensity distribution associated with the one peak in the range of particle sizes of less than 1,000 nm is at least 0.3 and no greater than 1.5.

2. The method for producing copper particles according to claim 1, wherein the salt is a salt having a sulfur atom-containing anion or a salt having an oxygen atom-containing anion.

3. The method for producing copper particles according to claim 1, wherein the copper compound is at least one selected from the group consisting of copper hydroxide, copper nitrate, copper sulfate, copper carbonate, copper formate, copper acetate, and copper sulfide.

4. The method for producing copper particles according to claim 1, wherein a maximum particle size of the copper particles as measured by dynamic light scattering is decreased by increasing a temperature of the heating of the mixture, or the maximum particle size of the copper particles as measured by dynamic light scattering is increased by decreasing the temperature of the heating of the mixture.

5. The method for producing copper particles according to claim 1, wherein a difference between a maximum particle size and a minimum particles size of the copper particles associated with the other peak is at least 2,500 nm.

6. The method for producing copper particles according to claim 1, wherein a combination of copper nitrate as the copper compound and 1,3-propanediol as the polyhydric alcohol is excluded.

7. The method for producing copper particles according to claim 1, wherein the copper compound is copper hydroxide, the salt of sodium is sodium sulfide, and the polyhydric alcohol is propanediol;

the copper compound is copper hydroxide, the salt of sodium is sodium sulfide, and the polyhydric alcohol is ethylene glycol;

the copper compound is copper nitrate, the salt of sodium is sodium hydroxide, and the polyhydric alcohol is ethylene glycol; or the copper compound is copper nitrate, the salt of sodium is sodium carbonate, and the polyhydric alcohol is ethylene glycol.

8. The method for producing copper particles according to claim 1, wherein the copper particles contain an atom derived from the salt of sodium, and the atom derived from the salt of sodium is present in cores of the respective copper particles.

* * * * *